US008169222B2

(12) United States Patent
Hornbostel et al.

(10) Patent No.: US 8,169,222 B2
(45) Date of Patent: May 1, 2012

(54) METHOD FOR ELECTROSEISMIC SURVEY DESIGN

(75) Inventors: Scott C. Hornbostel, Houston, TX (US); Kenneth E. Green, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 508 days.

(21) Appl. No.: 12/526,611

(22) PCT Filed: Apr. 2, 2008

(86) PCT No.: PCT/US2008/004283
§ 371 (c)(1),
(2), (4) Date: Aug. 10, 2009

(87) PCT Pub. No.: WO2008/133793
PCT Pub. Date: Nov. 6, 2008

(65) Prior Publication Data
US 2010/0039114 A1    Feb. 18, 2010

Related U.S. Application Data

(60) Provisional application No. 60/926,392, filed on Apr. 26, 2007.

(51) Int. Cl.
*G01V 3/12* (2006.01)
(52) U.S. Cl. ......... 324/331; 324/334; 324/337; 324/348
(58) Field of Classification Search .......... 324/331, 324/334, 337, 348
See application file for complete search history.

(56) References Cited

U.S. PATENT DOCUMENTS

| | | | |
|---|---|---|---|
| 4,573,354 A | 3/1986 | Voorhees et al. | 73/432 |
| 5,770,945 A | 6/1998 | Constable | 324/350 |
| 6,389,361 B1 | 5/2002 | Geiser | 702/15 |
| 6,628,119 B1 | 9/2003 | Eidesmo et al. | 324/337 |
| 7,539,279 B2 | 5/2009 | Lu et al. | 375/377 |
| 2006/0132137 A1 | 6/2006 | MacGregor et al. | 324/334 |

(Continued)

FOREIGN PATENT DOCUMENTS
WO    WO 03/048812    6/2003

(Continued)

OTHER PUBLICATIONS

Curtis, A. (2004) "Theory of Model-Based Geophysical Survey and Experimental Design," *The Leading Edge*, pp. 997-1004.

(Continued)

*Primary Examiner* — Reena Aurora
(74) *Attorney, Agent, or Firm* — ExxonMobil Upstream Research Co. Law Dept.

(57) ABSTRACT

A method for designing a controlled-source electromagnetic survey that will discriminate between a defined deep marginal-interest reservoir (2) and specified false positive resistivity structures of concern (3, 4, 5). A reservoir model and a false positive model are constructed for each false positive scenario. The resistivity of the false positive model may be tuned to give electromagnetic data similar enough to the reservoir model when forward modeled that any differences fall in the model null space. A null-space discriminating ratio ("NSDR") is defined, for example as the peak normalized difference of the two related modeled electromagnetic field data sets. An area coverage display of NSDR values (6) allows determination of such additional data as may be needed to distinguish the false positive body, and a survey design is developed accordingly (7). Reduction of the number of variables affecting the area coverage displays is a key feature of the method.

31 Claims, 16 Drawing Sheets

U.S. PATENT DOCUMENTS

2006/0203613 A1    9/2006    Thomsen et al. ............... 367/38

FOREIGN PATENT DOCUMENTS

| WO | WO 2004/053528 | 6/2004 |
| WO | WO 2005/117326 | 12/2005 |
| WO | WO 2006/115622 | 11/2006 |
| WO | WO 2006/135568 | 12/2006 |
| WO | WO 2007/046952 | 4/2007 |

OTHER PUBLICATIONS

Houck and Pavlov (2006) "Evaluating Reconnaissance CSEM Survey Designs Using Detection Theory," *The Leading Edge* 25, pp. 994-1004.

Maurer et al. (2000) "Design strategies for electromagnetic geophysical surveys", *Inverse Problems* 16, pp. 1097-1117.
US 6,522,146, 02/2003, Srnka (withdrawn)

METHOD FOR ELECTROSEISMIC SURVEY DESIGN

CROSS REFERENCE TO RELATED APPLICATIONS

This application is a National Stage entry under 35 U.S.C. 371 of PCT/US2008/004283 that published as WO 2008/133793 and was filed on 2 Apr. 2008 and claims the benefit of U.S. Provisional application 60/926,392 which was filed on Apr. 26, 2007.

FIELD OF THE INVENTION

This invention relates generally to the field of geophysical prospecting and, more particularly, to electromagnetic methods used to explore for hydrocarbons. Specifically, the invention is a method for designing a controlled-source electromagnetic survey for marine exploration.

BACKGROUND OF THE INVENTION

The marine controlled source electromagnetic ("CSEM") method typically uses a towed bipole source and deployed ocean-bottom receivers for mapping sub-seafloor resistivity variations; see, for example, U.S. Pat. No. 6,628,119 to Eidesmo et al.

The standard approaches for determining the survey receiver positions and source tow-line locations suffer from several limitations:
  Available displays of areal subsurface coverage are typically inadequate to evaluate a given survey design;
  There are so many variables that it can be difficult to tune a survey for specific geophysical objectives (e.g., types of data such as various components of E or B field, survey geometry parameters, reservoir and earth parameters, and inversion parameters);
  Methods that rely on multiple inversions are very time consuming; and
  Forward modeling approaches fail to examine the inversion null space issues (i.e., other models may give a similar data response).

Maurer et al. ("Design strategies for electromagnetic geophysical surveys", *Inverse Problems* 16, 1097-1117 (2000)) summarize the four families of current approaches for EM survey design. The first and most common approach involves using repeated forward modeling to look at the data that would result for various acquisition and earth scenarios. Most commonly, a simple sail-over source line is examined for the reservoir and no-reservoir cases to see if a reservoir would be detectable. This approach becomes intractable for reconnaissance survey optimization because of the many parameters to examine and the required number of forward models. It also does not examine null-space issues—i.e., that several models may have similar data so that the data analyst cannot readily distinguish among them.

The term null space means the collection of possible differences from a specified earth conductivity model that would produce little or no change in the specified acquired data. Strictly speaking, the null space would include only model differences that produce no change in the data, however, the term is used somewhat loosely herein to include model changes that produce only small data changes that would be less than the expected noise levels in the data. A null-space problem exists when two or more different conductivity structures produce very similar data and there is a significant exploration need to distinguish these cases. If these cases cannot be distinguished based on the given data, then an approach such as inversion will also be unable to distinguish them (unless additional geological or other a priori information is included or additional appropriate field data are acquired).

A second family of survey-design approaches examines data sensitivity with respect to model perturbations. A sensitivity display would illustrate the zones in the subsurface that most affect a particular data value for particular source and receiver locations. This display gives some idea of the areal extent of the zone that affects a particular measurement. Limitations of this approach include the need to model many parameters and measurement points and also the fact that the perturbation is relative to a particular starting model.

A third family of approaches examines a modified sensitivity plot—the "data importance" function. These functions express the influence of each data point on the final inversion result. This can be helpful in selecting the particular data that are most necessary in the survey design. A weakness is that the data importance is biased toward the most resolved portions of the model. Also the importance is necessarily determined with respect to a particular model example.

The fourth family of suggested approaches is based on global optimization. An objective function is minimized with respect to some simplified survey parameters. Because of the complexity of this approach, only simple cases are possible. An example might be to select the best 30 data points out of a set of 200 possible offset-frequency pairs. This approach is too limited for optimizing CSEM survey parameters because only small subsets of the model and data spaces can be considered.

In addition to these survey design approaches, Houck and Pavlov ("Evaluating reconnaissance CSEM survey designs using detection theory," *The Leading Edge* 25, 994-1004 (2006)) present a Monte Carlo method that predicts the value of information for competing survey design scenarios. The main focus of this approach is to determine the probabilities of discriminating economic from sub-economic reservoirs of unknown position given a survey configuration and information about its reservoir detection capability.

Except in simple cases, the current techniques are not adequate for determining an optimal CSEM survey design. Some weaknesses in these approaches include an inability to deal with the numerous possible survey and geological parameters, a lack of adequate diagnostic displays, and the lack of a means to assess different models that would produce similar data (i.e., the null-space problem). There is a need for an improved technique that addresses these deficiencies, and the present invention satisfies this need.

SUMMARY OF THE INVENTION

In one embodiment, the invention is a method for designing a controlled-source electromagnetic survey of a subsurface region for resistive bodies, including receiver deployment, source line location, and source transmission parameters, said method comprising:
  (a) developing a geological model of the subsurface region, said model comprising a deep, marginal target reservoir characterized by resistivity higher than background;
  (b) selecting a source transmission frequency tailored to the depth of the deep marginal target reservoir;
  (c) determining an initial survey design, specifying one or more source lines and one or more receiver locations, using the geologic model and the transmission frequency, and using as a criterion that the design must be able to discriminate between a model that includes the deep marginal target reservoir and a second model that is identical except that the target reservoir is replaced by background;

(d) specifying one or more additional A vs. B scenarios that the survey design must be able to discriminate upon inversion of the survey's electromagnetic field measurements in order to obtain a unique resistivity structure for the subsurface region;

(e) selecting an A vs. B scenario, and adapting the subsurface model as necessary to describe A and again to describe B;

(f) selecting an initial survey design including at least one selected transmission frequency;

(g) forward modeling data for the selected survey design from the previous step using the adapted models;

(h) obtaining a quantitative comparison of the forward-modeled data, A vs. B, at a plurality of (x,y) locations in the survey, resulting in a survey area coverage display for the selected survey design and scenario, wherein said quantitative comparison may be called a Null-Space Discriminating Ratio ("NSDR");

(i) repeating steps (e)-(h) for any other scenarios specified in step (d);

(j) constructing at least one survey area coverage display based on NSDR values at the plurality of (x,y) locations in the survey; and (k) choosing a final survey design based at least partly on the coverage displays and corresponding survey designs; wherein the number of variables affecting survey area coverage displays is reduced to a pre-selected number.

In a second embodiment, the present inventive method is a method for designing a controlled-source electromagnetic survey (CSEM) of a subsurface region for resistive bodies, said method comprising using a numerical discriminating factor to determine whether a proposed survey design can discriminate between two different hypothetical scenarios for the resistivity structure of the subsurface region, wherein the discriminating factor is related to a difference between two simulations of CSEM data using the proposed survey design, one simulation using a resistivity model of one of the two scenarios and the other simulation using a resistivity model of the other scenario, and wherein values of the discriminating factor representing the two models are computed for a plurality of (x,y) positions of a resistivity feature that differs between the two resistivity models, and are displayed in a 2D area display in which one or more survey receivers and at least one source line occupy fixed positions according to the proposed survey design. The proposed survey design may then be evaluated based on area coverage indicated by the values of the discriminating factor in the 2D area display. The proposed survey design may additionally be varied by either adding one or more receivers or one or more source lines, or both, or by adjusting receiver spacing or other survey geography dimensions, and then repeating the above-described process with a revised proposed survey design until the evaluation of a final survey design satisfies a pre-selected criterion or other stopping condition is met.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF EXAMPLE EMBODIMENTS

Figure 1:
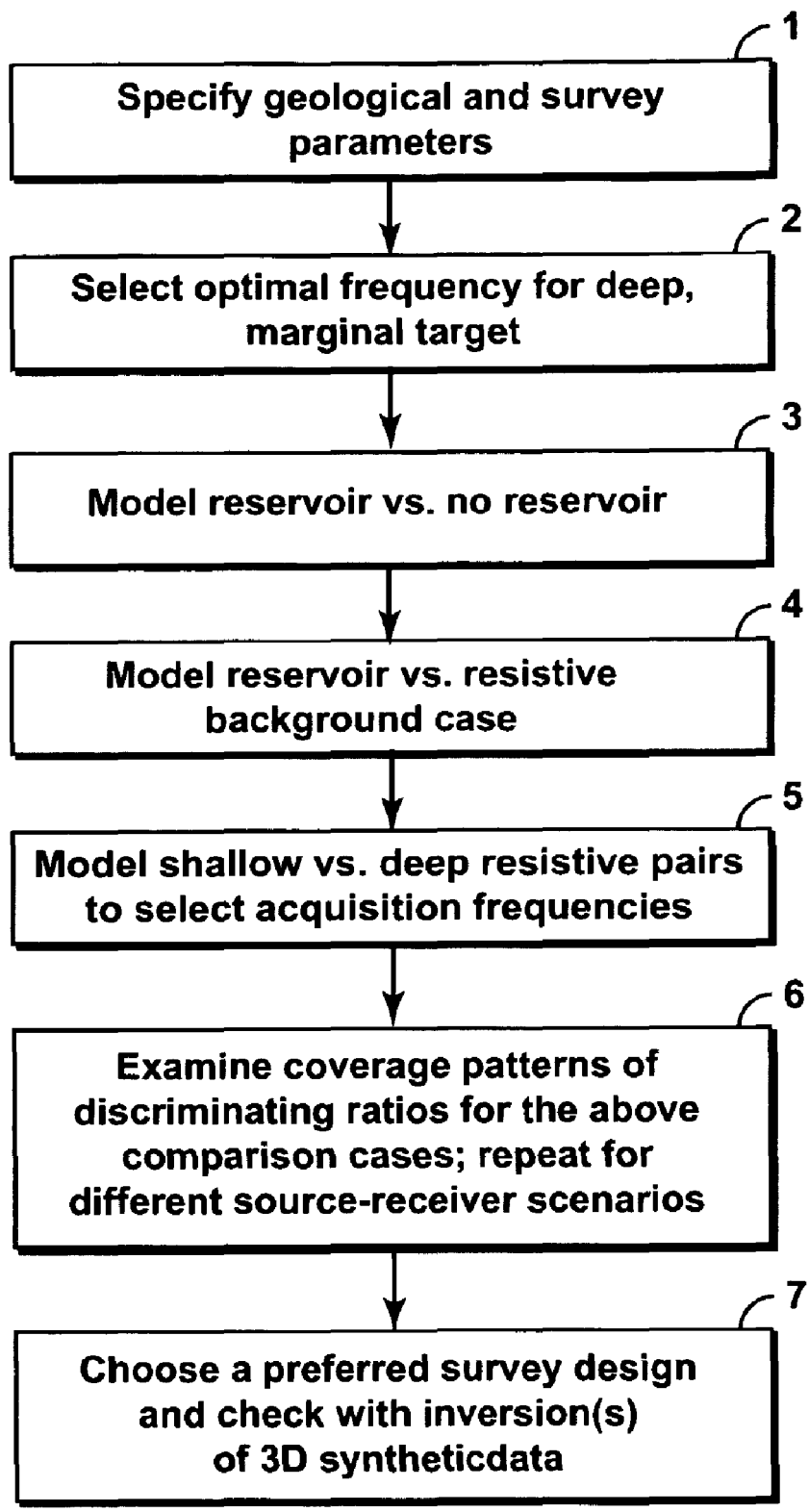
FIG. 1 is a flowchart showing basic steps in one embodiment of the present inventive method.

FIG. 1 is a flowchart showing basic steps for one embodiment of the present inventive CSEM survey design method.

The term survey design means determining at least the survey source lines and receiver locations, and the source transmission frequency or frequencies. The method begins at step 1 with the specification of some input parameters and then continues with a series of modeling steps that determine the acquisition frequencies and the source and receiver layout. The survey design is selected to optimize the coverage so that a subsequent inversion will adequately recover the subsurface conductivity structure.

Selected geological and survey input parameters are determined in step 1. These parameters may include, for example: a background conductivity model, a depth range of interest for potential reservoirs, other reservoir properties (e.g., resistivity and areal extent), and an estimate of the magnetotelluric noise threshold after data processing. The reservoir properties are used to determine a reservoir of marginal interest, while the magnetotelluric noise threshold helps in finding a maximum useful offset. Other important input parameters include water-bottom topography and possibly other issues affecting receiver placement or source tow-line constraints and constraints for survey cost.

The present survey design method uses two significant concepts to optimize the acquired survey data for later inversion. The first concept is the reduction of variables so that optimal survey design can be simply related to source and receiver geometries. The second concept is the "null space discriminating ratio" or NSDR. This ratio can be displayed to determine what additional data will be required to discriminate between two subsurface scenarios that would otherwise be ambiguous during the inversion. These concepts are explained in more detail below.

Areal Displays and Variable Reduction

Figure 2:
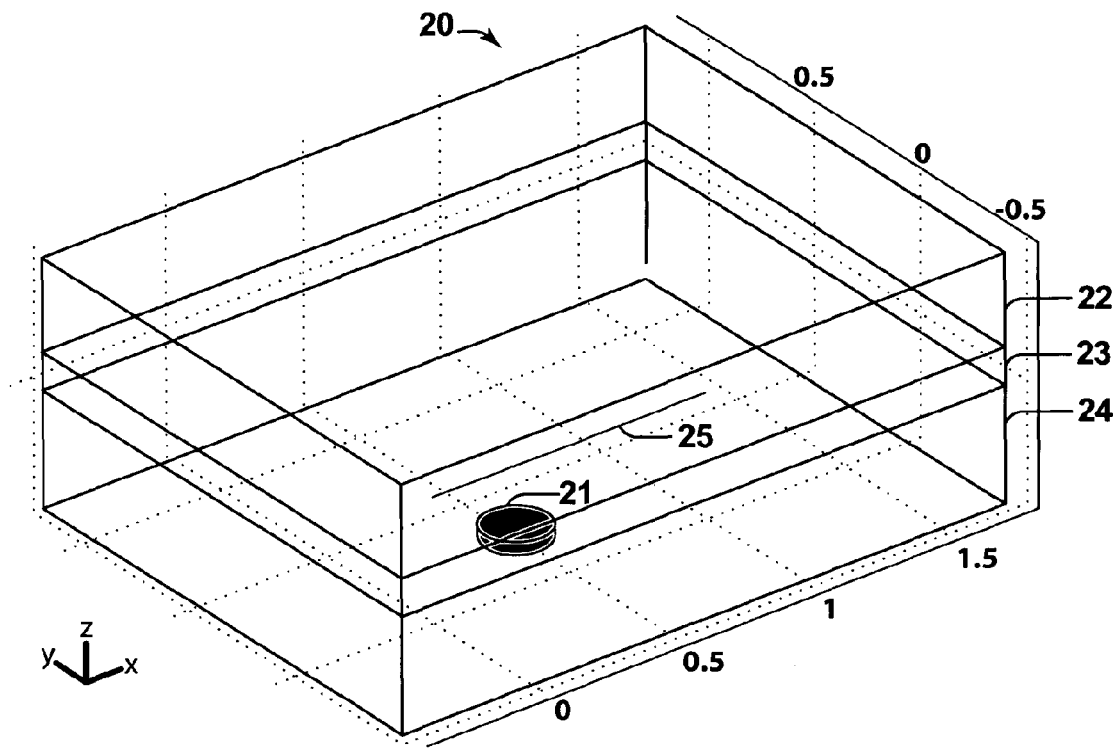
FIG. 2 shows a three-layer (air-water-shale) model with a cylindrical reservoir in the shale layer, the model being illustrative of a model that can be used in steps 2 and 3 of FIG. 1.
Figure 3:
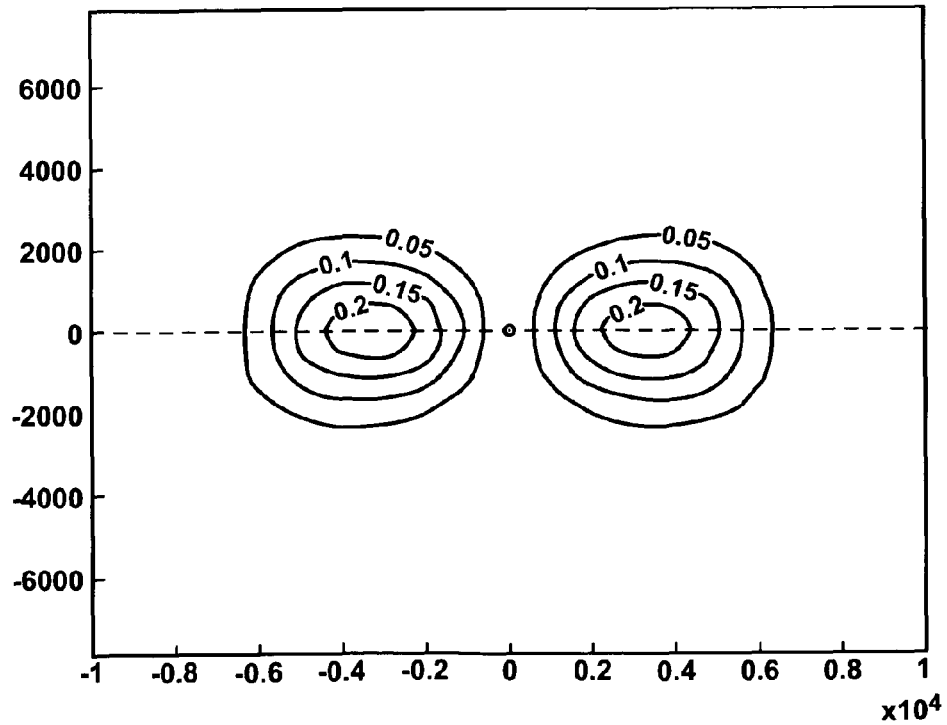
FIG. 3 shows peak normalized reservoir vs. no-reservoir anomaly for an E-W sail line over a receiver as a function of reservoir center (frequency is 0.35 Hz) for the model of FIG. 2.

One significant aspect of the present inventive method is the use of areal displays to illustrate the data sensitivity to important ratios such as the reservoir-to-no-reservoir case. FIG. 2 shows a cylindrical reservoir 21 in a background model 20 of air 22, water 23, and shale 24. A single water-bottom receiver and source sail line 25 are used. (For efficiency reasons, an equivalent model with a single source and line of receivers can be substituted by reciprocity.) The amplitude of the difference of the electric field data with and without the reservoir is then normalized by dividing by the amplitude of the no-reservoir data. The peak of this normalized difference (over a range of offsets) can be displayed as a function of the center of the reservoir body location for this particular source-receiver scenario, as is shown in FIGS. 3A and 3B where it may be seen that there are two locations where a reservoir, if one were there, would be detectable with the simulated electric field data used to generate the figure. FIG. 3 uses contours of constant values (of the normalized electric field differences) to convey the results. In practice, a color display would typically be used with the normalized differences represented by a color scale.

In FIG. 3, the scale on each axis is distance in meters. The origin—the center of the plot in this case—is the (x.y) location of the single receiver. The plot shows the normalized electric field difference plotted at the reservoir location, as the modeling calculation is done for various reservoir locations. The calculations assume an E-W (x-axis) source line, with differences from various offsets taken into consideration in arriving at the plotted number for each reservoir location. Thus, the display illustrates the peak relative anomaly caused by the cylindrical reservoir as a function of the reservoir location (i.e., the subsurface coverage provided by this source-receiver combination.) For example, if the noise level were such that the anomaly (normalized difference) must be at least 0.2 in magnitude to be detected, this particular source line and receiver location would reveal the presence of such a reservoir body only if its center were located within one of the two smallest contour ovals in the display. Other scenarios with multiple receivers and/or source lines can be similarly displayed. In creating this display, many variables are held fixed to make the survey design process practical.

In the present inventive method, choices of inversion parameters and algorithms, for example, may be ignored by focusing on the forward-modeled data domain. Instead, it is assumed that inversion will properly sort out the correct earth model as long as sufficient data are provided for its discrimination.

The data parameters are simplified by taking (in one embodiment of the invention) a complex difference of the three E-field measurements (i.e., Ex, Ey, and Ez with and without reservoir) to determine the anomaly. The magnitude of this total-field anomaly is then normalized, preferably by the magnitude without a reservoir. As a result, any difference in Ex, Ey, or Ez in the amplitude or phase will be captured. This, of course, assumes that all components are available. A different coverage display would be required if one or more components are missing or unusable. A different coverage display would also be needed if magnetic field intensity is used instead of (or in addition to) the electric field measurements. The data may then be further collapsed by considering only the peak relative anomaly over all acquired offsets. The acceptable offsets may be limited by an assumed noise threshold (e.g., the amplitude before normalization must be greater than $1 \times 10 \exp{-15}$ V/m).

The reservoir parameters may be simplified by assuming a marginal reservoir for this initial analysis. (Marginal means minimally acceptable from an economic interest standpoint.) For the current example (FIGS. 2, 3), an economic reservoir zone of marginal size (a 4 km$^2$ circular disk of 400 m thickness and 25 ohm-m resistivity) is selected at the deep end of targeted depths (e.g., from 2100 m to 2500 m below the water bottom). The relative anomalies are shown as a function of the position of this marginal targeted reservoir. Larger or shallower reservoirs would give a larger anomaly. (The separate issue of discriminating deep from shallow resistive bodies is discussed later.)

After this reduction in variables, the major remaining parameters are the source and receiver geometry, as desired. The detectability of the deep, marginal reservoir can now be assessed for various receiver and source-line scenarios.

The Reservoir vs. No-Reservoir Case

Figure 4:
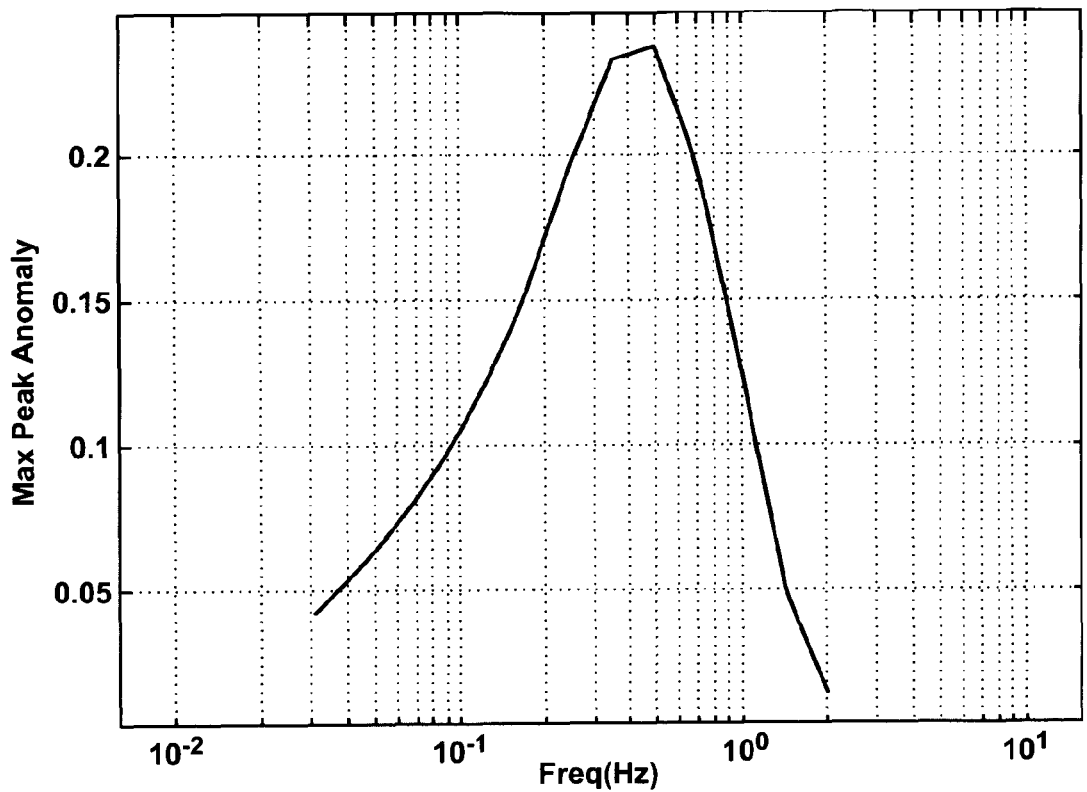
FIG. 4 shows the maximum of the peak normalized reservoir vs. no-reservoir anomalies as a function of frequency, indicating the largest relative anomalies occurring at between 0.35 and 0.5 Hz.

The objective of step 3 is that the survey must be able to distinguish the deep, marginal reservoir selected in step 1 from background resistivity. The inline data coverage pattern in FIG. 3 is modeled for a specific frequency (0.35 Hz in this case). For this model, the peak relative anomaly is 23%. Other frequencies would have different peak values as illustrated in FIG. 4. This figure can be used to select an optimal fundamental frequency as required in step 2 of the invention embodiment of FIG. 1. The peak anomaly for this deep target occurs at a frequency of between 0.35 and 0.5 Hz in FIG. 4. One would normally select a fundamental frequency that is near or slightly less than the peak frequency. In this case, 0.35 Hz will be selected because its coverage pattern is somewhat broader than it would be at 0.5 Hz.

In step 3 of FIG. 1, a series of anomaly coverage plots like FIG. 3 are generated for single-receiver, single-source-line pairs at the selected optimal frequency. As described above, these are generated using a series of modeling evaluations with different reservoir positions. The differences between the data with and without the reservoir are normalized, preferably by dividing by the amplitude of the data without the reservoir. The peak (over offset) normalized anomaly is illustrated as a function of the center of the modeled reservoir position as previously discussed in connection with FIG. 3.

Figure 5:
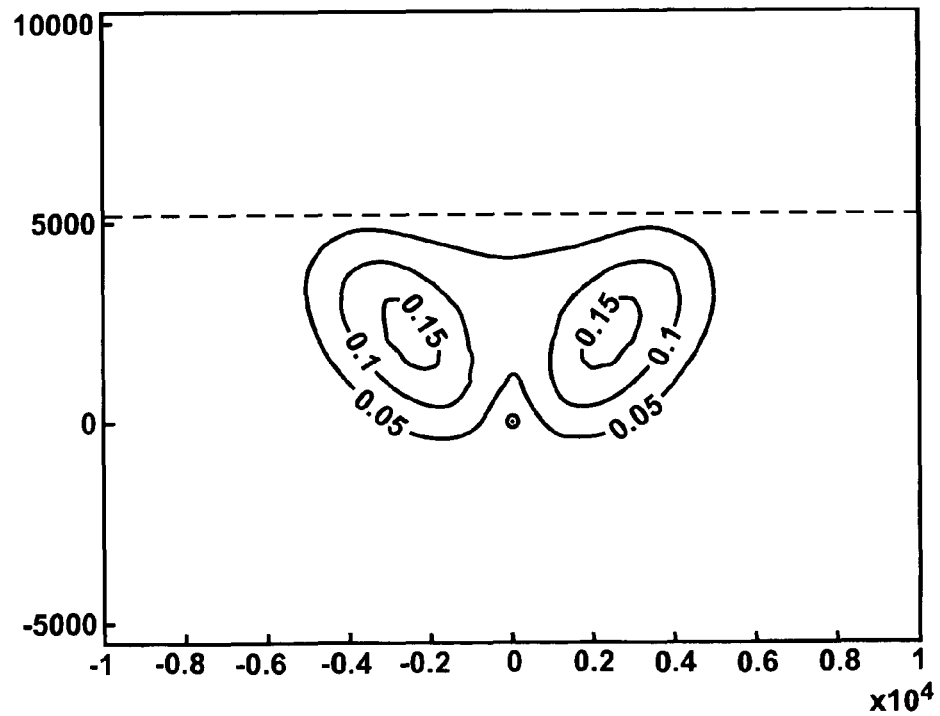
FIG. 5 shows peak normalized reservoir vs. no-reservoir anomaly for an E-W sail line at 5.2 km offset from a receiver as a function of reservoir center (frequency is 0.35 Hz)

Similar, single-receiver displays can be modeled for a variety of source-line offsets from the receiver position. An example is shown in FIG. 5 for the case where the source line has a 5.2 km offset from the receiver (the dashed line y=5.2 km). A set of these single-receiver, single-source-line displays can then be combined for multiple receivers and source lines. These source-receiver geometries can be evaluated to find a survey design with adequate spatial coverage where the presence of the deep reservoir would sufficiently affect the acquired data.

The NSDR (Null Space Discriminating Ratio)

In steps 4 and 5 of FIG. 1, a feature of some embodiments of the present invention that will be called the Null Space Discriminating Ratio (or NSDR) is brought into play. This ratio is a normalized difference between two models where the difference would fall into the inversion null space for a selected set of data. It may be called a "discriminating" ratio because if it becomes non-negligible due to additional data, that indicates that the data can now discriminate between the two modeled cases. The reader will note that the technique of step 3 above may also be considered to be an application of the NSDR approach. More generally, the present inventive method uses some numerical discriminating factor that is derived from simulated data as a quantitative measure of the degree to which data modeled using a proposed survey design are able to distinguish one given resistivity scenario from a second such scenario.

The present inventive method and steps 4 and 5 in particular are designed to see that sufficient data are acquired such that the inversion process can find an appropriate reservoir solution without confusion from other troubling models that differ only in the null space of the data. The NSDR analysis can be performed in the forward-modeled data domain without recourse to actual inversions. This avoids multiple time-consuming inversions. One might still choose to do a selection of inversion examples as a spot check.

The subject of step 4 of FIG. 1 is the potential ambiguity between a target reservoir and an increase in the background resistivity. The subject of step 5 is the potential ambiguity between selected pairs of resistive bodies at differing depths. These two steps typically lead to the addition of broadside data and multi-frequency data, respectively, to the survey.

These two discriminations (along with the step 3 discrimination of reservoir from no-reservoir) may be sufficient for some survey design problems. One can imagine other cases that also may be of interest including: discrimination of a reservoir from an anisotropic shale, discrimination of different reservoir edge locations, and discrimination of economic from sub economic reservoirs. These additional steps may be included in different embodiments of the invention, but are not shown in FIG. 1.

Any potential ambiguity in the inversion process can be analyzed using the NSDR concept. The first step would be to specify the two ambiguous model cases that give similar data results. The difference of these two cases is normalized by the amplitude of one of the cases to give the NSDR. This NSDR can now be studied as a function of additional data that can be brought to bear. In some cases, the additional data will be able to discriminate between these two, initially ambiguous models. If this is the case, coverage displays of the NSDR can illustrate the portions of the subsurface that can now be accurately inverted without this ambiguity.

It may be that no hypothetical additional data will be found that are capable of making this discrimination. (Or the additional data may be deemed too expensive.) In this case, the inverted results will remain ambiguous with respect to these two scenarios. It is possible that geological information or other geophysical data may be used to make the discrimination.

In other cases, it may be that there is a proposed ambiguity but no two models can be specified that have similar data everywhere. If this is the case, it may not be a true ambiguity since the data are already capable of making the discrimination.

The Reservoir vs. Resistive-Background Case

Figure 6:
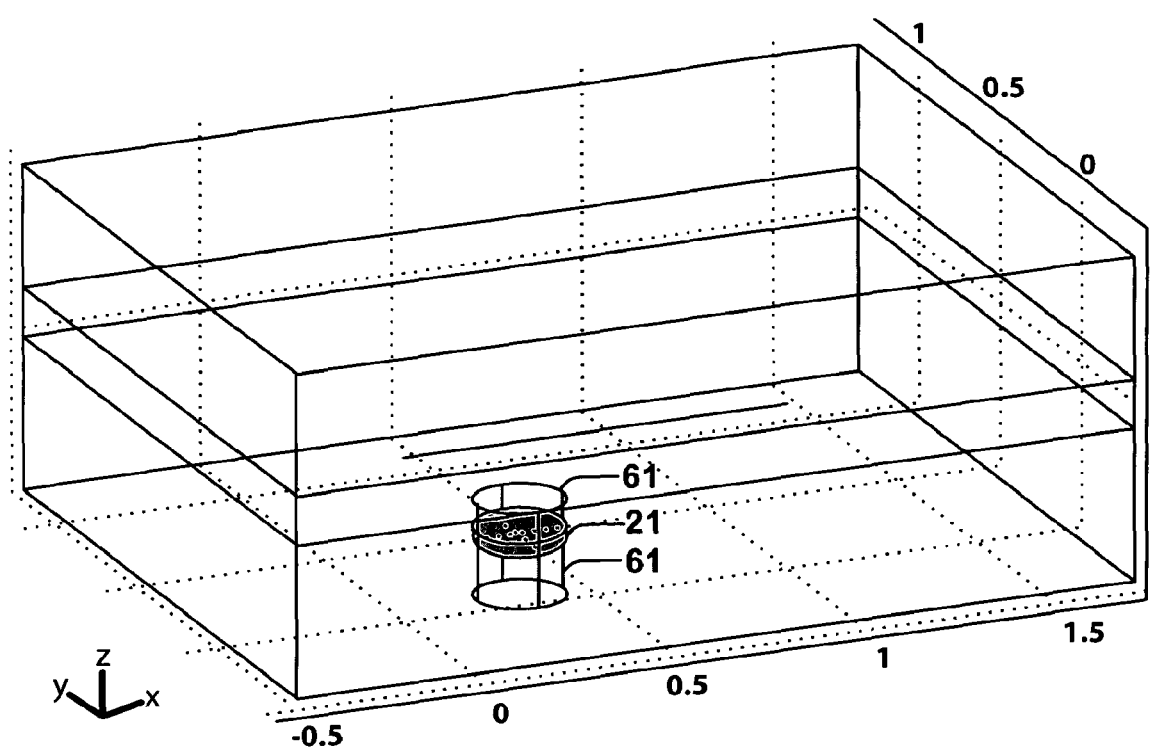
FIG. 6 shows a model used to illustrate step 4 of FIG. 1, the model having a thin cylindrical reservoir and surrounding thick resistive background cylinder, where the model layers are air/water/shale.

In step 4 of FIG. 1, the ambiguity between a target reservoir and an increase in the background resistivity is investigated preferably using only inline data. FIG. 6 illustrates two models that present such an ambiguity. One model is the same as FIG. 2 with cylindrical disk reservoir 21, and the other model replaces disk 21 with the larger cylinder 61 of lower resistivity. In this example, the background cylinder 61 has a four square km (cross-sectional) area and goes from 1.5 km to 4.0 km below the water bottom. The reservoir 21 also has a four square km area but goes from 2.1 km to 2.5 km below the water bottom (as in the previous example).

The NSDR analysis begins by selecting the background (large cylinder 61) resistivity such that the inline data are nearly the same as the inline data for the thin-cylinder reservoir 21. This matched background model will be used to form the NSDR for further analysis.

Figure 7:
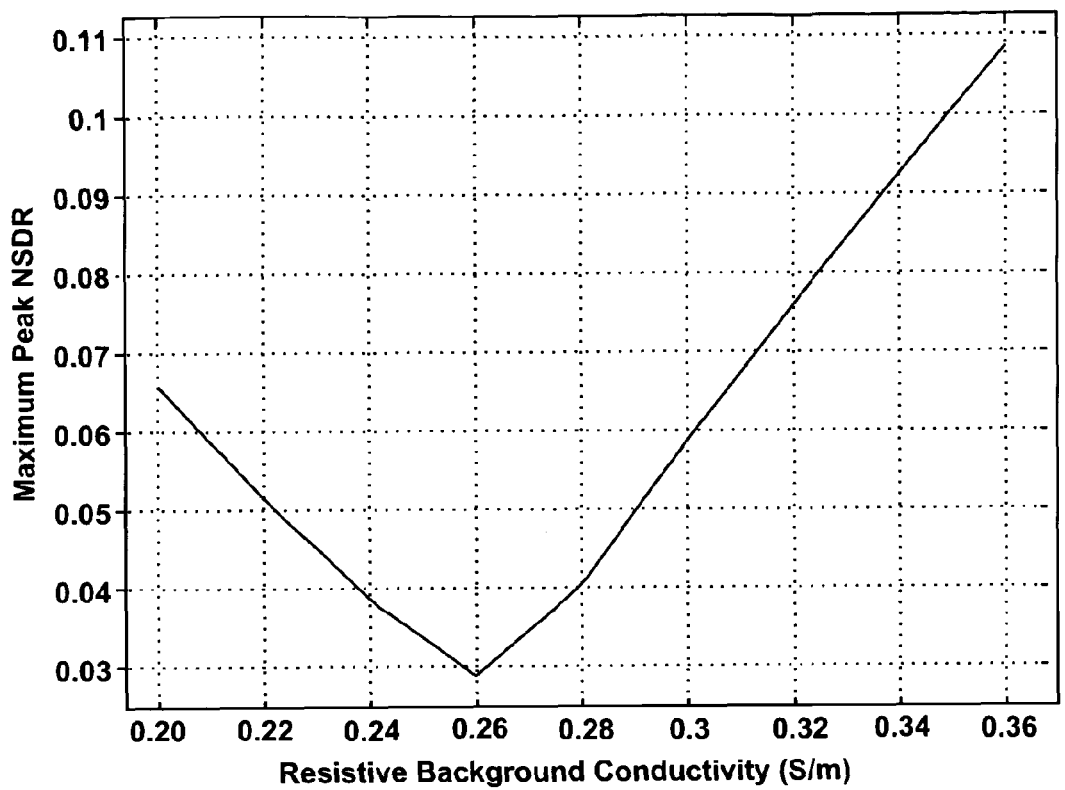
FIG. 7 shows the maximum (over all background layer positions) of peak normalized reservoir vs. background resistive layer (inline data) as a function of resistive background conductivity for the model of FIG. 6, showing a minimum occurring at about 0.26 S/m which is used to "tune" the model of FIG. 6.

FIG. 7 shows the result of a sweep of models with varying background conductivity. Each data point represents the maximum normalized difference (or NSDR) between the reservoir case and the background (large-cylinder) case over all cylinder positions for a given background conductivity. The minimum occurs at a background cylinder value of 0.26 S/m which produces data with less than a 3% difference from the reservoir model at all offsets. This is close enough to be considered indistinguishable because of noise and other expected variability in the data.

Figure 8:
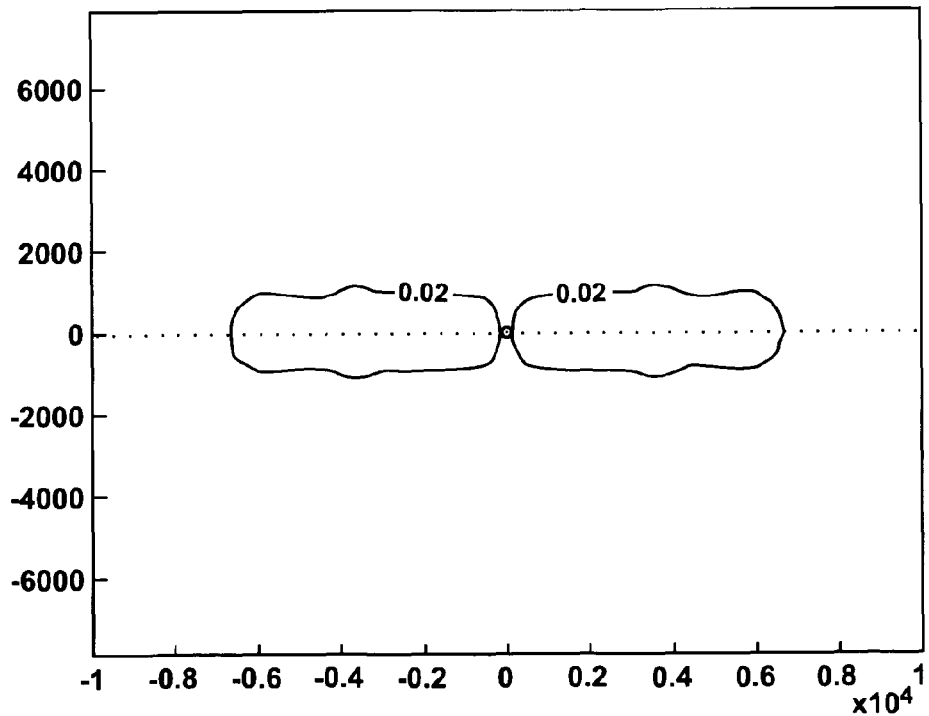
FIG. 8 shows normalized reservoir vs. background resistive layer (NSDR) for inline data, i.e. the coverage pattern with the background layer's resistivity tuned in accordance with FIG. 7.

FIG. 8 shows the coverage pattern for this NSDR when using inline data. (FIG. 8 would typically be a color display in practice.) As noted above, the NSDR is everywhere less than 3% (and outside the contour lines is less than 2%) meaning that these inline data are unable to discriminate between the two cases of a thin reservoir and a broad background cylinder with matched resistivity.

Figure 9:
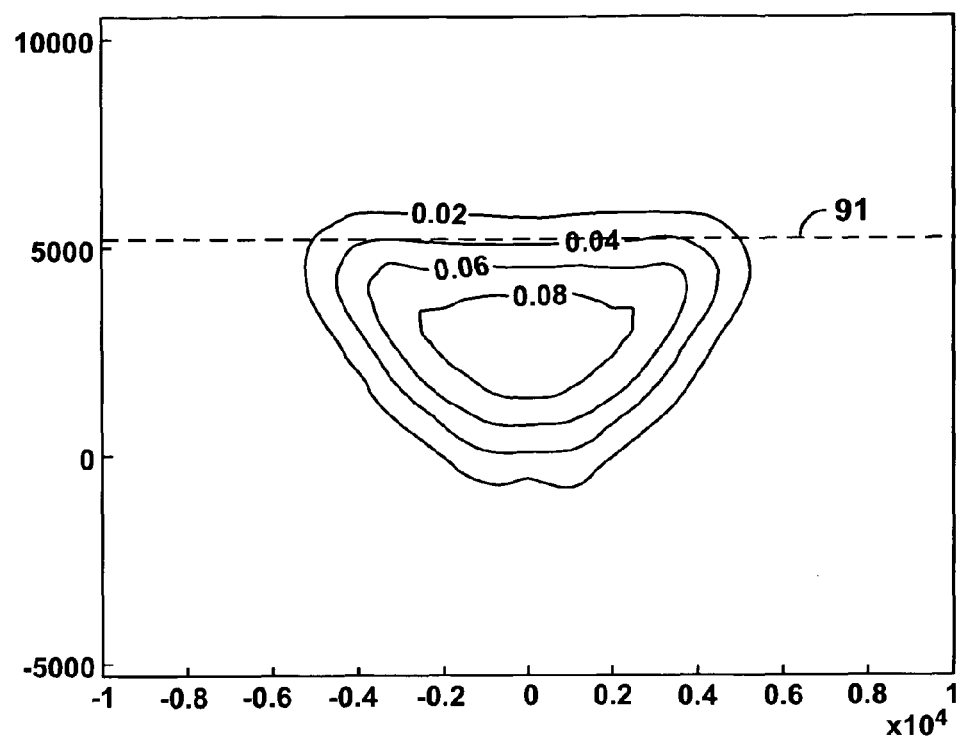
FIG. 9 shows normalized reservoir vs. background resistive layer (NSDR) for broadside data with offset of 5.2 km, i.e. the impact on the coverage of FIG. 8 due to addition of broadside data.

Additional data (broadside data in this case) are next examined to see if the NSDR becomes large enough to make this discrimination. An example of NSDR coverage for data with a broadside offset of 5.2 km is illustrated in FIG. 9. In this case, the display shows a region between the receiver and the broadside source line 91 where the two cases differ by nearly 10%. Again, FIGS. 8 and 9 illustrate the maximum NSDR value for all the data in the indicated source-line/receiver combination as a function of the position of the large cylinder and reservoir pair.

Similar single-receiver displays can be modeled for a variety of source-line offsets from the receiver position. These displays can then be combined for a set of receivers and source lines. Ideally, the data from these composite displays would show coverage everywhere for this discrimination of reservoir vs. higher-background-resistivity structures.

Shallow vs. Deep Resistive Pairs

Figure 10:
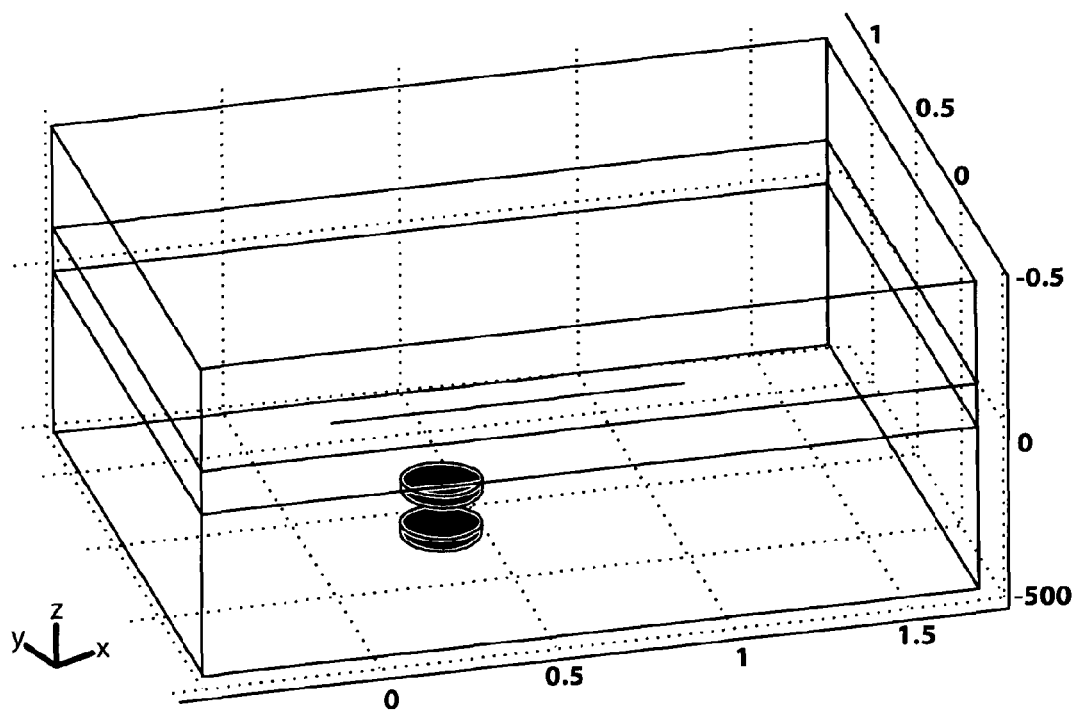
FIG. 10 shows a model used to illustrate step 5 of FIG. 1, the model having a pair of thin cylindrical resistive disks with background model layers air/water/shale.

In step 5 of FIG. 1, we investigate the potential ambiguity between selected pairs of resistive bodies at differing depths. For example, an uneconomic shallow gas deposit may be mistaken to be a deeper, economic hydrocarbon reservoir, unless the method can discriminate between these two scenarios by providing data that are adequate to allow the inversion to properly position the resistive bodies in depth. An example of one depth pair is given in FIG. 10.

As before, the first step in designing the NSDR is to tune the two models so that their data are similar. In this example, the deeper body has its conductivity set to 0.04 S/m while the shallower body is tuned to minimize the maximum difference between the two cases. The background shale in the air/water/shale model is set to a conductivity of 0.5 S/m.

Figure 11:
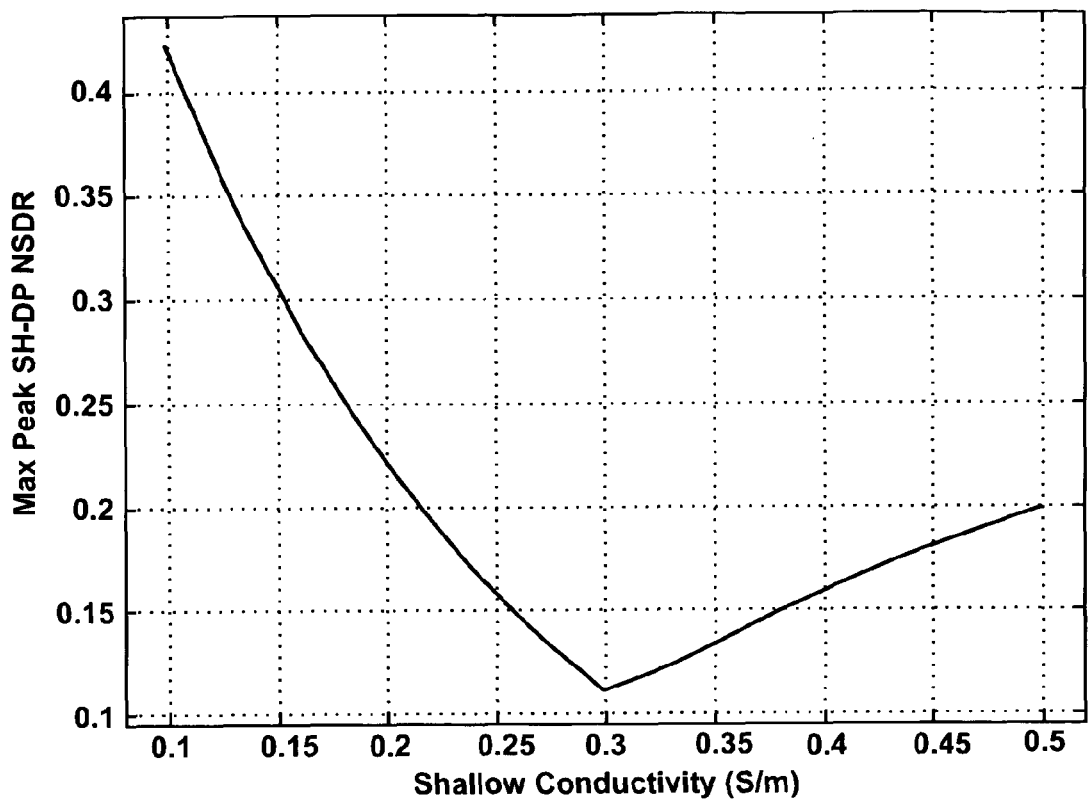
FIG. 11 shows maximum of peak normalized shallow target at 1100 m vs. deep target at 2100 m (0.04 S/m) as a function of shallow target conductivity in the model of FIG. 10, with the best match occurring at shallow conductivity of 0.30 S/m with peak difference of about 11%.
Figure 12:
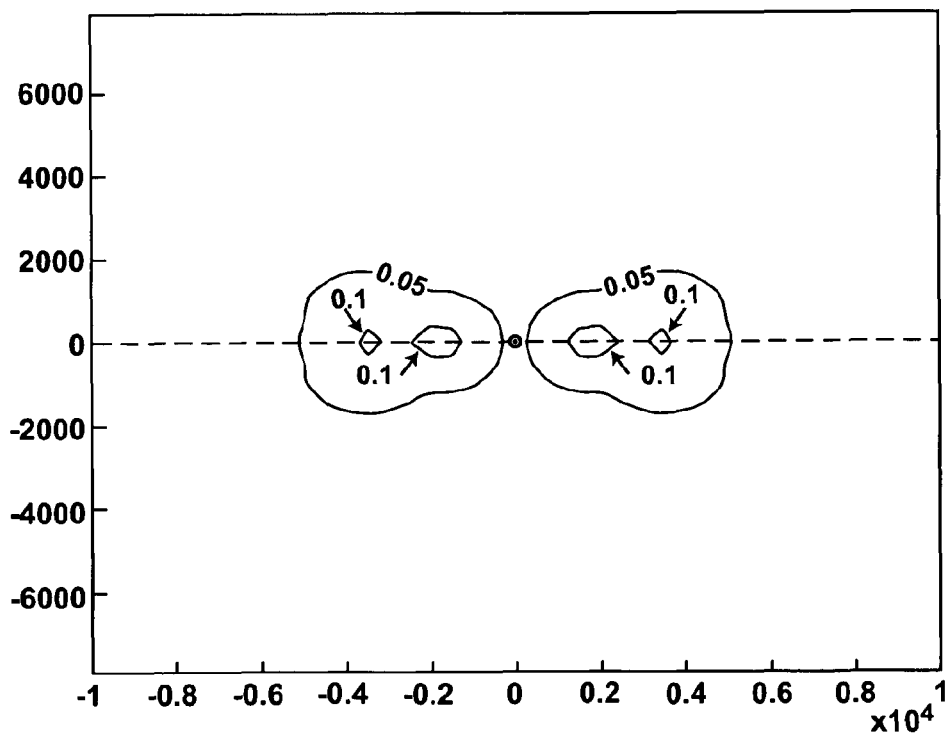
FIG. 12 shows normalized shallow (1100 m) vs. deep (2100 m) resistive layers (NSDR) for inline data and the model of FIG. 10, where the shallow conductivity is tuned to minimize this peak ratio at 0.35 Hz and the peak relative anomaly is 11%.

FIG. 11 illustrates the maximum peak NSDR for the comparison of resistive bodies at 1100 m and 2100 m as a function of the conductivity at 1100 m. (The conductivity of the body at 2100 m is set to 0.04 S/m). At a shallow conductivity of 0.3 S/m, the two cases have data that differ by no more than 11% for all areal positions of the resistive bodies with inline data at 0.35 Hz. The areal distribution of this tuned NSDR for inline data is shown in FIG. 12. (Where the term maximum peak is used herein, peak will refer to different source-receiver offsets, while maximum refers to different areal (x,y) positions of the resistive bodies.)

In some situations, this 11% difference might be adequate to discriminate the two depths and no null-space issue would be involved. If one still suspected some ambiguity, the two cases could be adjusted to give more similar data—for example, by allowing the shallow body to vary in diameter or conductivity distribution. The two cases would then represent a real null-space issue and one could study the related NSDR. For the current example, it will be assumed that the 11% anomaly is not adequate and that an additional frequency is desired to more clearly discriminate the two cases.

Figure 13:
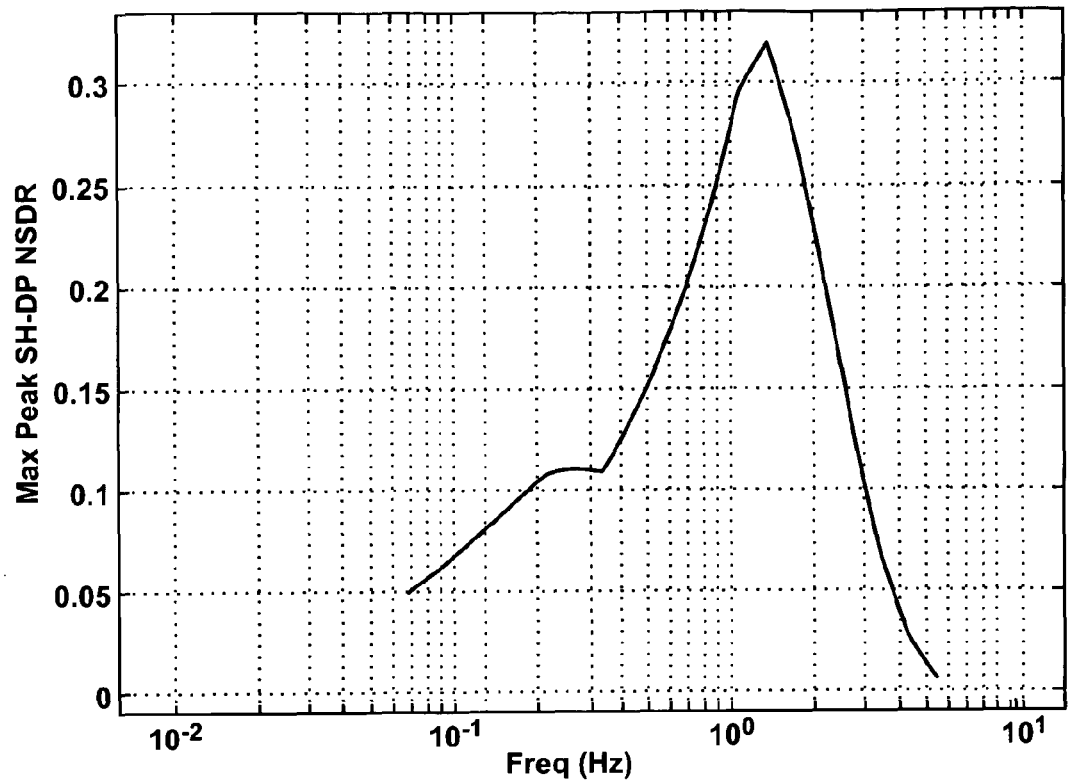
FIG. 13 shows peak shallow vs. deep target NSDR as a function of frequency for the model of FIG. 10 with shallow target at 1100 m (0.30 S/m) and deep target at 2100 m (0.04 S/m), the peak differentiating frequency occurring at 1.4 Hz with peak difference of about 32%.

In FIG. 13, the NSDR built from the tuned resistive bodies at 1100 m and 2100 m is studied as a function of the frequency. The relative null at 0.35 Hz is evident where the two cases have been tuned to be similar. Also evident is the increasing discrimination at higher frequencies. The two depths are best discriminated at 1.4 Hz where the peak relative difference is 32%.

Other depth pairs can be similarly studied to help in the selection of the optimal acquisition frequencies. Based on the geophysical interpretation needs, a set of depths can be selected for which discrimination is important. In the current example, it will be assumed that it is important to discriminate resistive bodies at 500 m, 1100 m, and 2100 m. This leads to three depth pairs: 500 m-1100 m, 500 m-2100 m, and 1100 m-2100 m. The first two pairs would be studied in a manner similar to that used above for the 1100 m-2100 m case.

Figure 14:
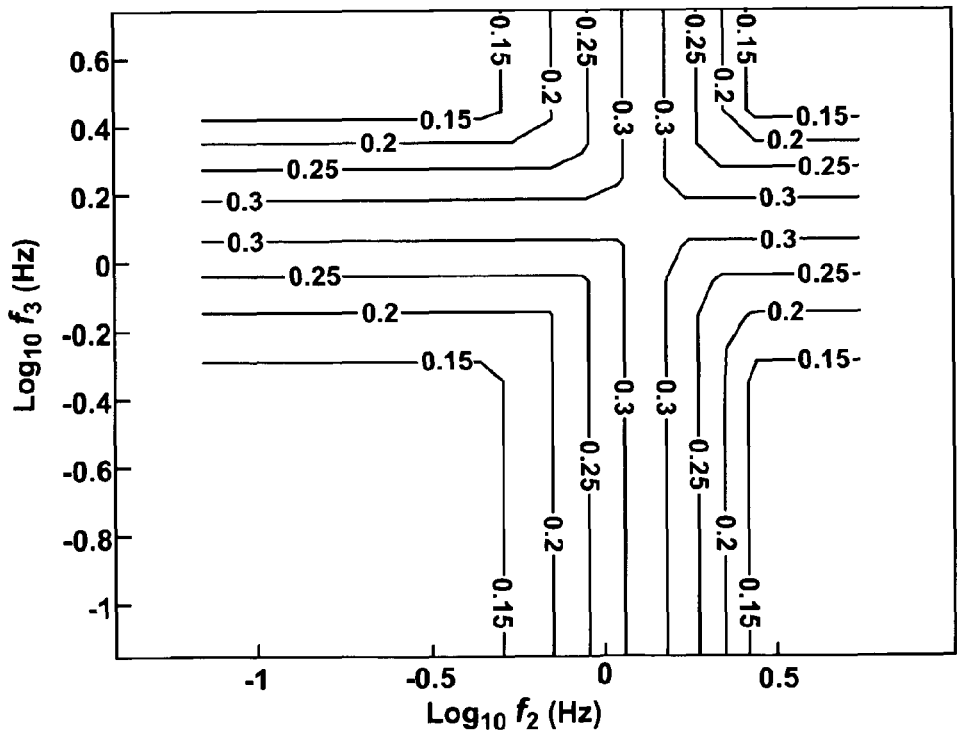
FIG. 14 shows an NSDR plot illustrating the minimum (over a set of three depth pairs) of the maximum discriminating ratio value for the three frequencies ($f_1$ fixed at 0.35 Hz, $f_2$ and $f_3$ varying on the x-y axes), where it may be noted that the addition of one more frequency at 1.4 Hz will raise the minimum NSDR to 32% (from 11% with 0.35 Hz alone)

The combination of these three cases can be evaluated using a display such as FIG. 14. Here the minimax NSDR (minimum over the set of three depth pairs of the maximum over the three frequencies at a given depth pair) is illustrated as a function of the second and third frequencies that are modeled. (The initial frequency at 0.35 Hz is assumed.) In this example, there is no apparent need for a third frequency since the addition of the 1.4 Hz model is sufficient to boost the minimax NSDR to 32% (from 11% at 0.35 Hz alone). Also note that the 1100-2100 depth pairing is the critical one since these minimax values are the same as would have been obtained from that pairing alone.

At this point, some tradeoffs must be considered when selecting the appropriate frequencies for the survey so that the needed data may all be collected in a single pass of the source along each survey line, not absolutely essential but very desirable from a cost standpoint. The main issue will be to find a set of frequencies that can be collected using available CSEM source waveforms. The square wave, for example, includes a fundamental frequency and its odd harmonics. Logarithmically spaced multi-peak waveforms, such as tri-peak, quad-peak, and penta-peak waveforms described in PCT Patent Publication No. WO 2005/117326 can also be considered. Other arbitrary collections of frequencies can be assembled using time-division multiple waveforms as described in PCT Patent Application Publication No. WO 2007/046952.

Figure 15:
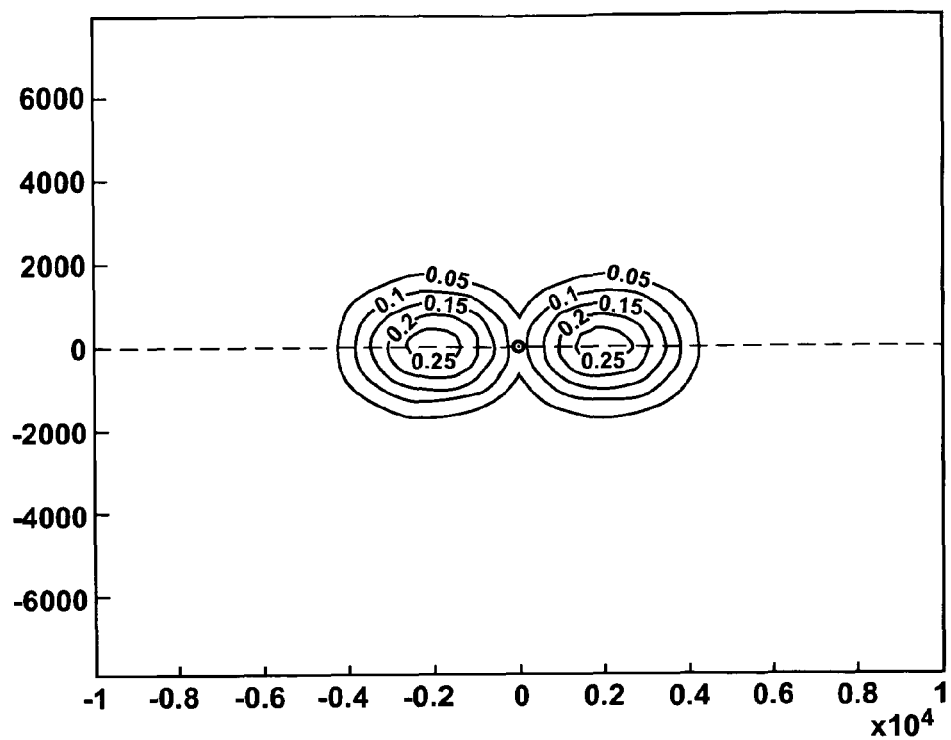
FIG. 15 shows the change to FIG. 12 when the 1.4 Hz second frequency is changed to 1.05 Hz, increasing the normalized shallow (1100 m) vs. deep (2100 m) NSDR to a new peak value of 28%.

For this case, source transmission frequencies of 0.35 Hz and 1.05 Hz are selected, which can be generated with a simple square wave with fundamental frequency at 0.35 Hz. The upper frequency will have a slightly reduced NSDR value from the optimal value at 1.4 Hz but has the advantage of having a broader coverage pattern (from the reduced frequency) as well as being easily generated as the third harmonic of the 0.35 Hz square wave. The coverage pattern for the 1100 m vs. 2100 m NSDR at 1.05 Hz is illustrated in FIG. 15. The NSDR has a maximum value of 28% compared with the maximum of 11% for the same models at 0.35 Hz (FIG. 12).

Coverage Patterns and Survey Design

In step 6 of FIG. 1, coverage patterns of the above discriminating ratios are examined for selected source-receiver scenarios. At this stage, field constraints such as water-bottom topography and production infrastructure can be considered in the placement of various source lines and receivers.

These scenario coverage patterns are constructed using the single-receiver, single-source-line patterns illustrated earlier, i.e. FIGS. 3, 5, 8, 9, 12 and 15 plus other similar patterns not shown herein. The overall pattern is a composite of these individual patterns and can be assembled in at least two ways. In the first approach, the value posted at a given areal location is the maximum relative anomaly over all the individual patterns that would apply there. In other words, the presence of the reservoir (or other NSDR) at a given location would imply that at least one source-receiver combination will have the posted relative anomaly.

In the second approach, the value posted at a given areal location is a root-square sum of all the NSDR values that would apply at that location. This value is obtained by taking the square root of the sum of the squares of all the relevant NSDR values. This approach would be appropriate if the various measurements can be considered to be independent evaluations of that subsurface location each with random, uncorrelated errors. The first approach would lead to a more conservative evaluation while the second approach would capture the value of a multiplicity of measurements of a given location. These issues will be clarified in the later example. Persons who work in the field will be able to think of other ways to arrive at a single value to be posted at a given (x,y) location.

The root-square sum (RSS) of the NSDR values is useful because it allows rough comparisons between different surveys. A single 40% anomaly, for example, may be roughly equivalent to four measurements of 20% each (i.e., 40%= $\sqrt{4} \times 20\%$). For this reason, the RSS value may also be called an "equivalent anomaly." The number of measurements that are combined would be known as fold in a seismic setting. In determining an acceptable survey design, the redundancy or fold would be selected such that the equivalent anomaly is above some predetermined value. An equivalent anomaly of 100%, for example, may be considered acceptable for a variety of surveys.

Each acquisition scenario may be examined for the reservoir vs. no-reservoir anomaly as well as for all of the important NSDR values under consideration. Ideally, the scenario would demonstrate adequate coverage of the area of interest for all of these NSDRs. Gaps in the coverage are undesirable since they indicate locations where reservoirs would be missed or where important model ambiguities would be left unresolved. Ideal coverage, of course, must be balanced with the related acquisition costs.

One of the coverage pattern issues is the study of some inadequate scenarios to examine the related weaknesses. There will always be pressure to minimize costs and this should only be done with a full understanding of what is being sacrificed. In addition, coverage studies can be used to identify critical receiver and source-line locations as opposed to the secondary, less-critical locations.

In step 7 of FIG. 1, a preferred survey design or small set of preferred designs is selected. This design or small set of designs can then optionally be further checked by model inversions. For this verification step, simulated data are first modeled for each acquisition scenario. These data are then inverted and the inverted results are compared with the correct model. Multiple geologic models can also be checked, if desired, to validate the ability of the inversion to appropriately discriminate cases where model ambiguity from null-space issues are a concern. Model inversions can also be compared with the various coverage displays to evaluate any acquisition footprints that are left in the inverted result. These footprint comparisons are also useful at a later stage when interpreting actual inverted field-data results.

EXAMPLE 1

Consider a hypothetical acquisition scenario with five deployed receivers and six source lines. In this example, the source-receiver patterns generated earlier will be combined to evaluate the overall coverage pattern. Four receivers are located just outside a potential reservoir area while the fifth receiver is located in a no-reservoir area. (Placing no receiver over the potential reservoir area reflects what may be seen in all the single-receiver coverage figures such as FIG. 3: the high sensitivity areas are never directly below a receiver.)

Figure 16:
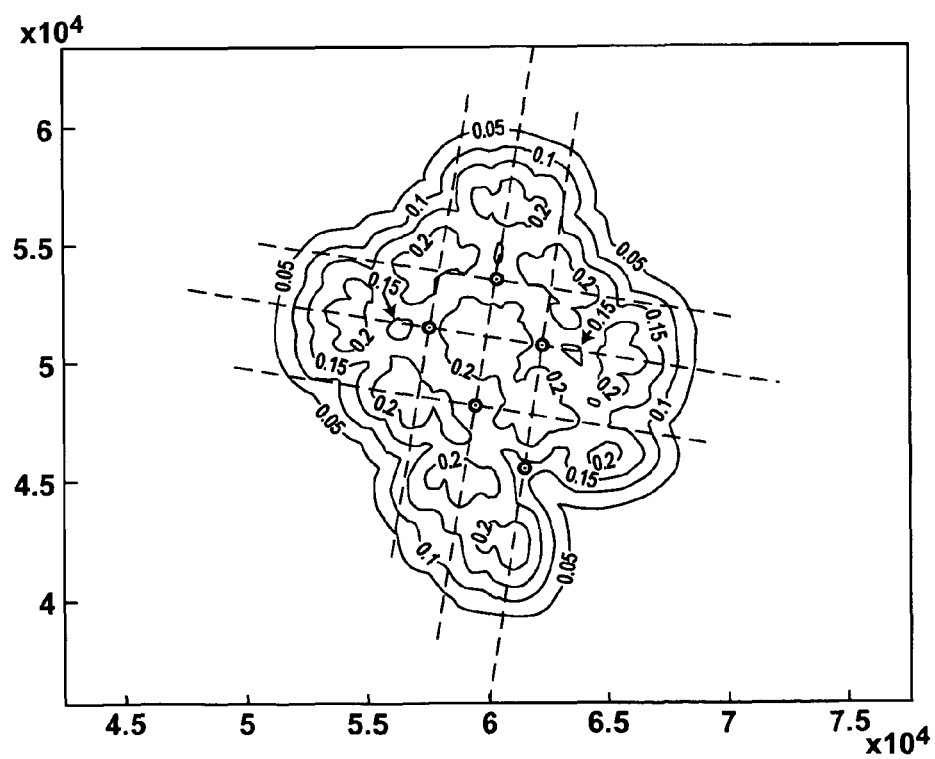
FIG. 16 shows the coverage pattern for a survey design with five receivers and six source lines with the maximum (peak) reservoir vs. no-reservoir anomaly being displayed using inline and broadside patterns.

FIG. 16 shows a composite coverage display for this scenario. The broken lines are the source lines, and the dark dots represent the stationary receivers. The maximum reservoir vs. no-reservoir anomaly is displayed using inline and broadside patterns with broadside spacing of 2.6 km and 5.2 km. (The spacing between source lines is 2.6 km.) In this (and the following) examples, the single-receiver, single-source-line patterns are taken from those described in the prior section (e.g., FIGS. 3 and 5). As described earlier, the plotted anomaly is based on a comparison of models (FIG. 2) with and without a marginal reservoir of four square km areal extent and 400 m reservoir zone (from 2.1 km to 2.5 km below the water bottom) with 25 ohm-m resistivity. The background is a shale at 2 ohm-m except for a transition zone near the water bottom where the conductivity tapers down from the water conductivity. Above the shale is a saline water layer of 1.3 km with 3.5 S/m conductivity. The source frequency in these models is 0.35 Hz.

The coverage pattern in FIG. 16 is fairly complete, meaning that a reservoir as described above will generate a relative anomaly of over 20% in most potential locations that are covered by the survey. A few areas with lesser peak anomalies are also evident. In this maximum anomaly display, a value of 22%, for example, means that at least one of the source-receiver pairings will see a 22% anomaly for a reservoir at that location.

Figure 17:
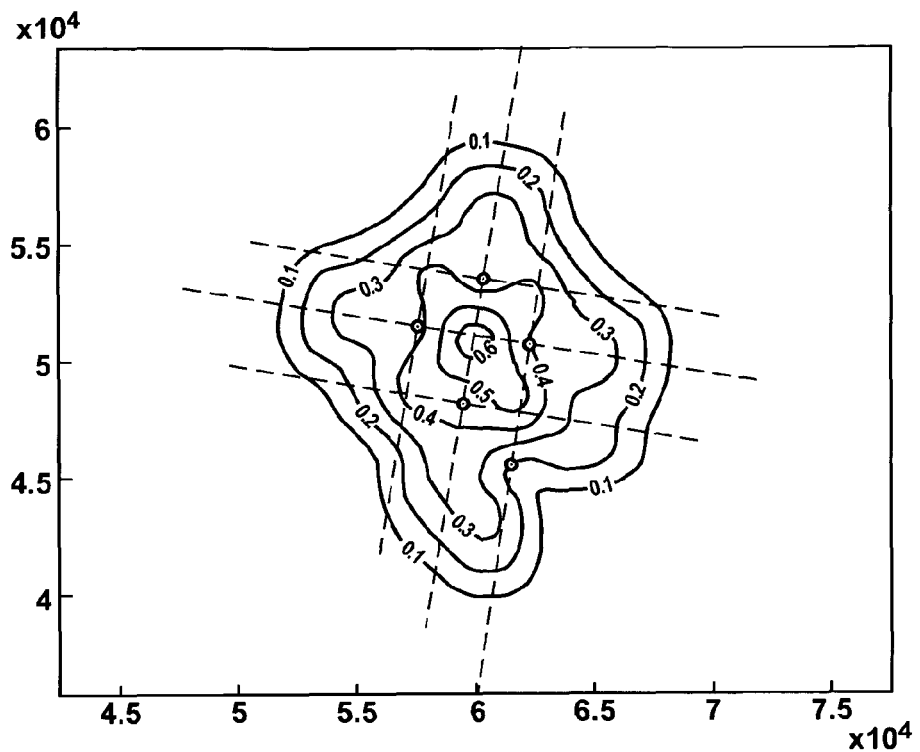
FIG. 17 shows the coverage pattern for the same survey design as in FIG. 16, with the root-square sum of reservoir vs. no-reservoir anomalies being displayed using inline and broadside patterns.

Another way to display the composite coverage pattern is by using the root-square sum as in FIG. 17. This display captures the effect of the multiple source-receiver combinations that all relate to a given areal location. It is clear from this display that the central region of interest (inside the four top receivers) has a multiplicity of coverage that leads to an improved value and should lead to an improved inversion result. Some good coverage toward the bottom of the display (a "tail" away from the reservoir area) is also evident in both FIGS. 16 and 17.

Figure 18:
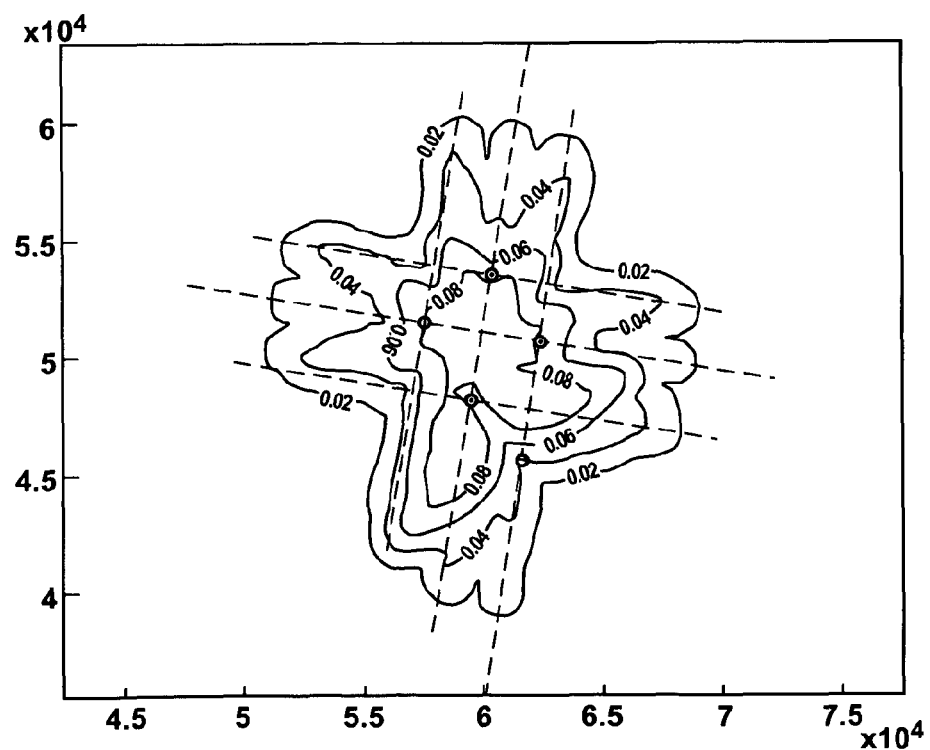
FIG. 18 shows the coverage pattern for the same survey design as in FIG. 16, with the maximum reservoir vs. resistive background NSDR being displayed using inline and broadside patterns.
Figure 19:
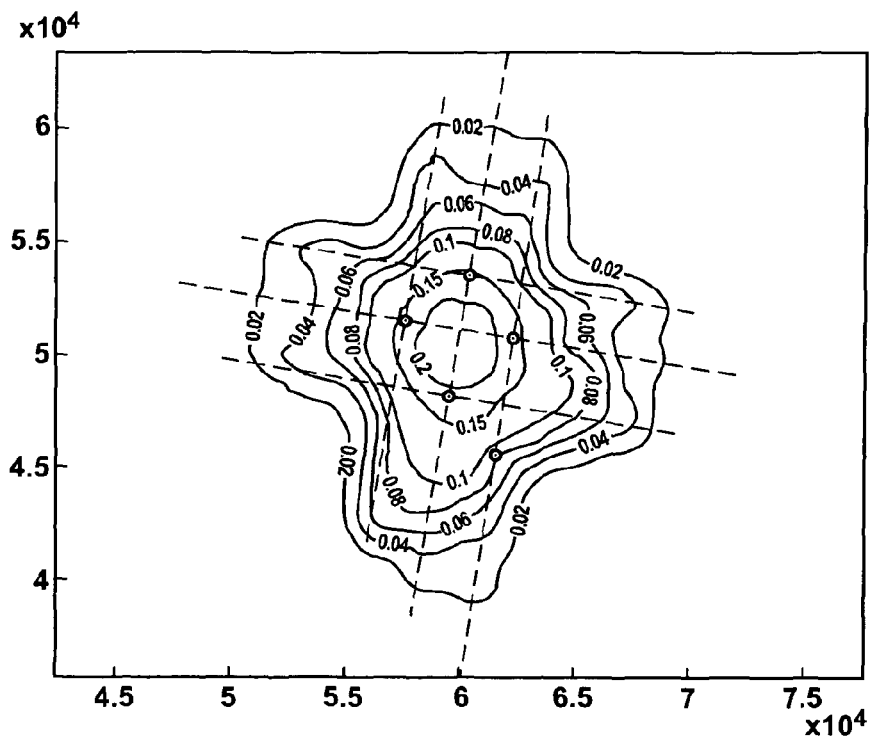
FIG. 19 shows the coverage pattern for the same survey design as in FIG. 16, with the root square-sum reservoir vs. resistive background NSDR being displayed using inline and broadside patterns.

Similar displays of maximum and root-square sum NSDR for reservoir vs. increased background resistivity are displayed in FIGS. 18 and 19. Recall that this case is tuned such that the inline data provide little discriminating ability. (See FIGS. 8 and 9 for examples of inline coverage and 5.2 km broadside coverage.) The composite coverage for this NSDR is very dependent on having adequate broadside information. The proposed scenario gives coverage inside the four top receivers with some coverage at the bottom from the additional receiver. Note that the coverage for this NSDR has a different pattern from the reservoir vs. no-reservoir anomaly display in FIGS. 16 and 17.

Figure 20:
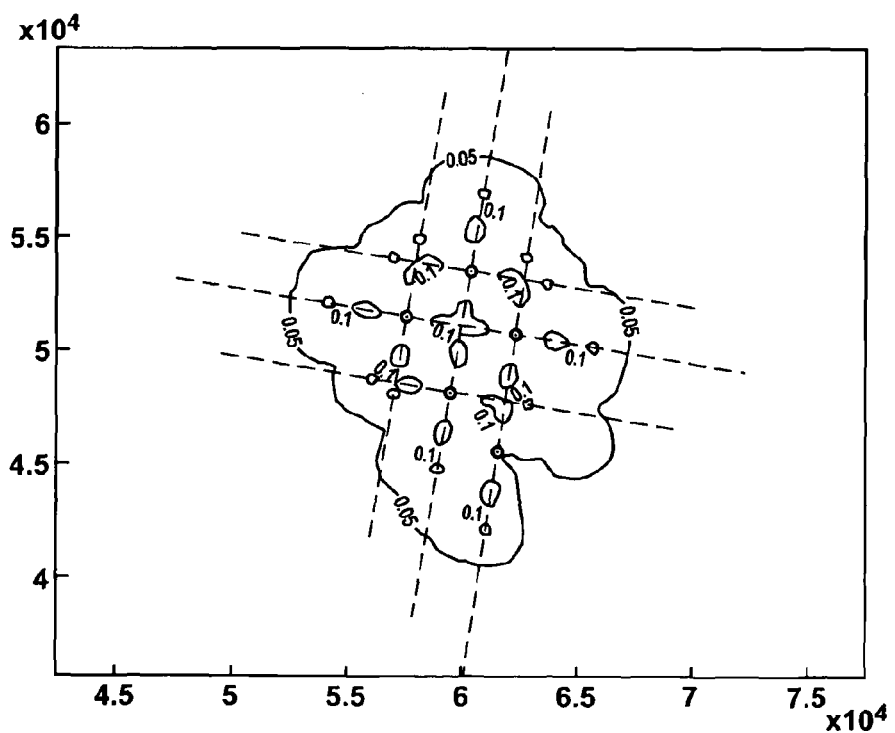
FIG. 20 shows the coverage pattern for the same survey design as in FIG. 16, with the maximum shallow (1100 m) vs. deep (2100 m) NSDR being illustrated for the case with only 0.35 Hz (inline and broadside data are included)
Figure 21:
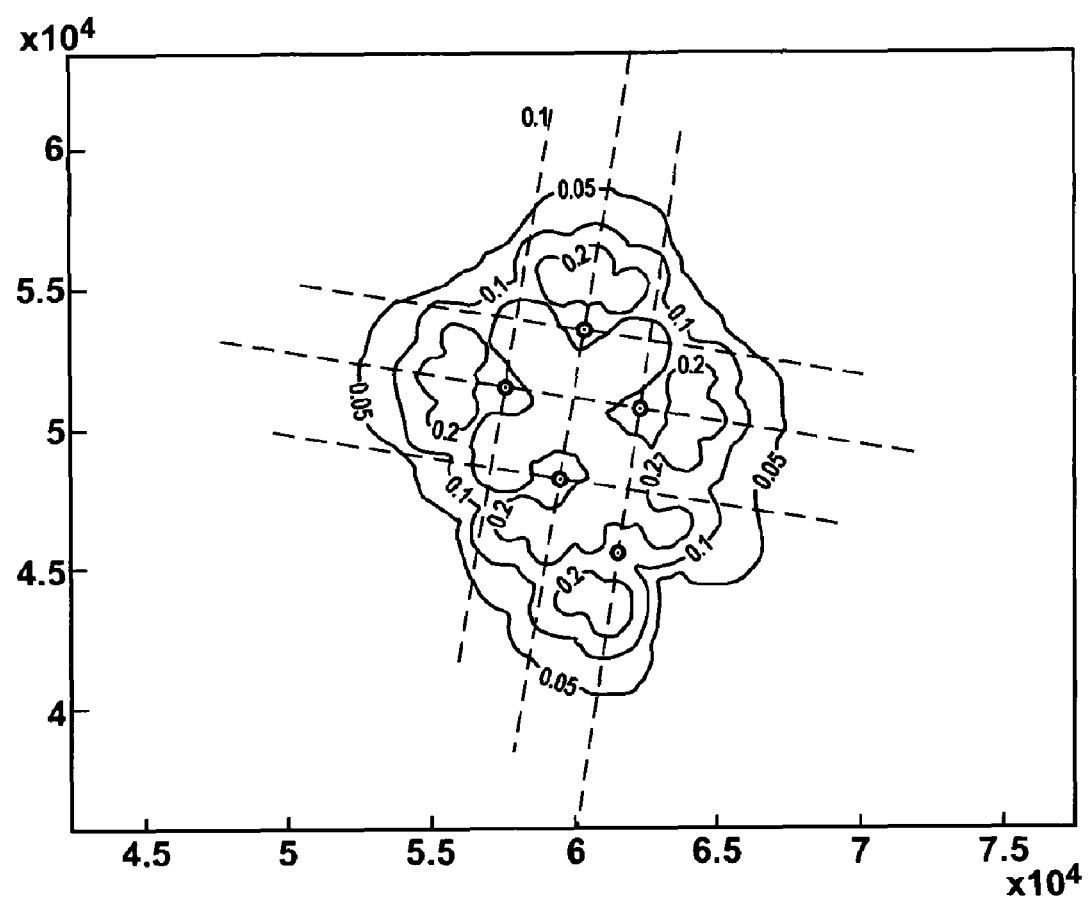
FIG. 21 shows the coverage pattern for the same survey design as in FIG. 16, with the maximum shallow (1100 m) vs. deep (2100 m) NSDR being illustrated for the combined 0.35 and 1.05 Hz cases (inline and broadside data are included)

The final issue addressed in this example is that of distinguishing a shallow vs. deep resistive body. The shallow resistive body (0.3 S/m) is 1100 m below water bottom and has conductivity tuned to match the response of a 0.04 S/m body at 2100 m at 0.35 Hz (as described above). The related inline NSDR pattern in FIG. 12 is combined with similar broadside patterns to give the composite result in FIG. 20. Note that this discrimination is small, as expected. Adding a second frequency at 1.05 Hz leads to the better composite coverage in FIG. 21. (An example of an individual inline pattern at 1.05 Hz is given in FIG. 15.) The composite coverage for this example has some more gaps because of the higher frequency (and smaller wavelength). If this depth discrimination is important, it might be necessary to consider tighter source or receiver spacing.

Before settling on this proposed acquisition scenario, one could evaluate other scenarios with varied spacing or with one or more receivers or source lines removed, for example. It might also be important to design other NSDR comparisons where inversion ambiguities might be expected. The various patterns can be compared with later conductivity inversion results to assist with interpretation of acquisition footprint issues.

EXAMPLE 2

For a second example, consider a reconnaissance situation where the objective is to cover a large area at minimum expense. The NSDR approach of the present invention can be used to determine the minimally acceptable survey that will still be able to discriminate important ambiguities. For this example, the reservoir vs. no-reservoir NSDR will be examined along with an NSDR with a change in only the horizontal resistivity. Coverage with respect to these two discriminating ratios will be sufficient to ensure that resistivity anisotropy can be determined (since the reservoir vs. no-reservoir case is related to vertical resistivity). Anisotropy discrimination is similar to the reservoir vs. general background NSDR described earlier. It is important because one needs to tell the difference between a reservoir and a general change in background for obvious exploration reasons. It is known that vertical resistivity by itself cannot easily discriminate between a reservoir and a broad but smaller increase in background resistivity. The horizontal resistivity is needed to make this discrimination. Anisotropy is defined as the property wherein the vertical and horizontal resistivities may differ.

In this example, the background resistivity is approximately 5 ohm-m (vertical) and 2.5 ohm-m (horizontal). For the reservoir vs. no-reservoir NSDR, the reservoir is a circular cylinder with diameter of 4 km, thickness of 700 m (from 1.1 km to 1.8 km below the water bottom), and resistivity of 16 ohm-m (vertical) and 4 ohm-m (horizontal). For the change in horizontal resistivity NSDR, the cylindrical body that is evaluated has diameter of 4 km, thickness of 1.5 km (from 0.7 km to 2.2 km below the water bottom), and resistivity of 5 ohm-m (vertical) and 5 ohm-m (horizontal). For comparison, the background has 5 ohm-m (vertical) and 2.5 ohm-m (horizontal) as noted earlier.

Figure 22:
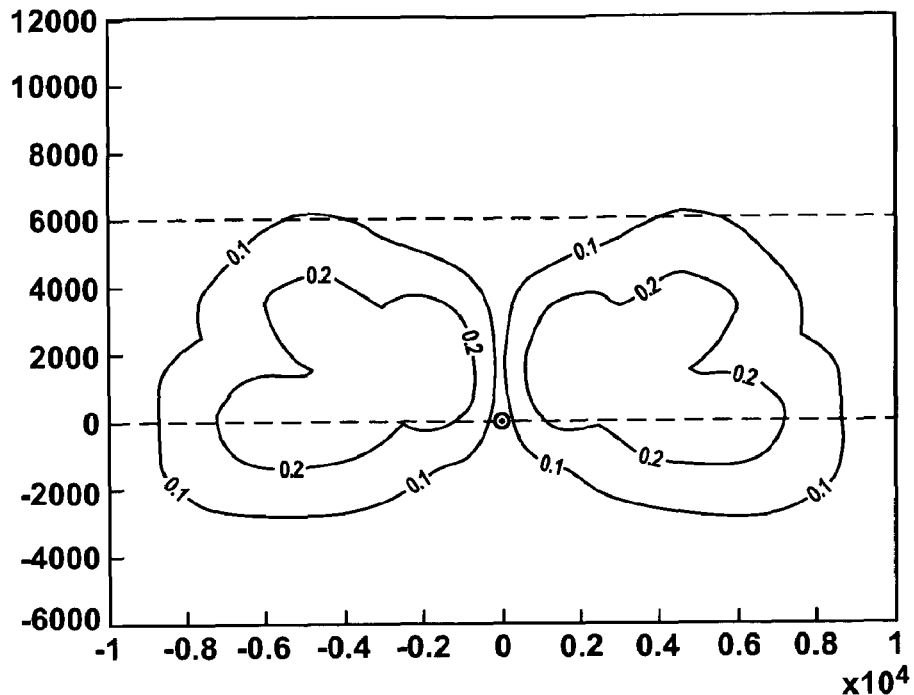
FIG. 22 shows the coverage pattern for a single receiver and two source lines (one over the receiver and one with 6 km broadside offset) for the maximum (peak) reservoir vs. no-reservoir anomaly being displayed using inline and broadside patterns.
Figure 23:
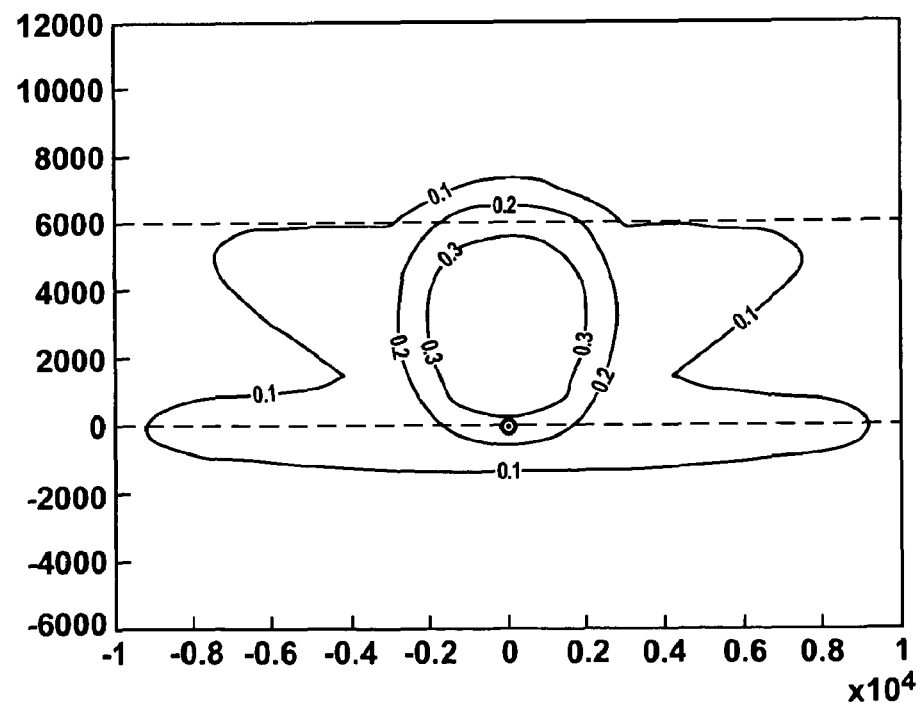
FIG. 23 shows the coverage pattern for a single receiver and two source lines (one over the receiver and one with 6 km broadside offset) for the maximum (peak) more resistive horizontal resistivity vs. unchanged horizontal resistivity NSDR being displayed using inline and broadside patterns.

The building blocks for this example will be the single-receiver sensitivity patterns with a source line over the receiver and also with a source line with broadside offset. FIG. 22 shows the relative reservoir anomaly for the single receiver. FIG. 23 shows the relative anomaly when comparing a case with an increase in horizontal resistivity to the case with no such change. It is clear in this latter figure that the broadside line is essential. The broadside offset was selected to be 6 km in this example since it maximized the sensitivity to a change in horizontal resistivity.

Figure 24:
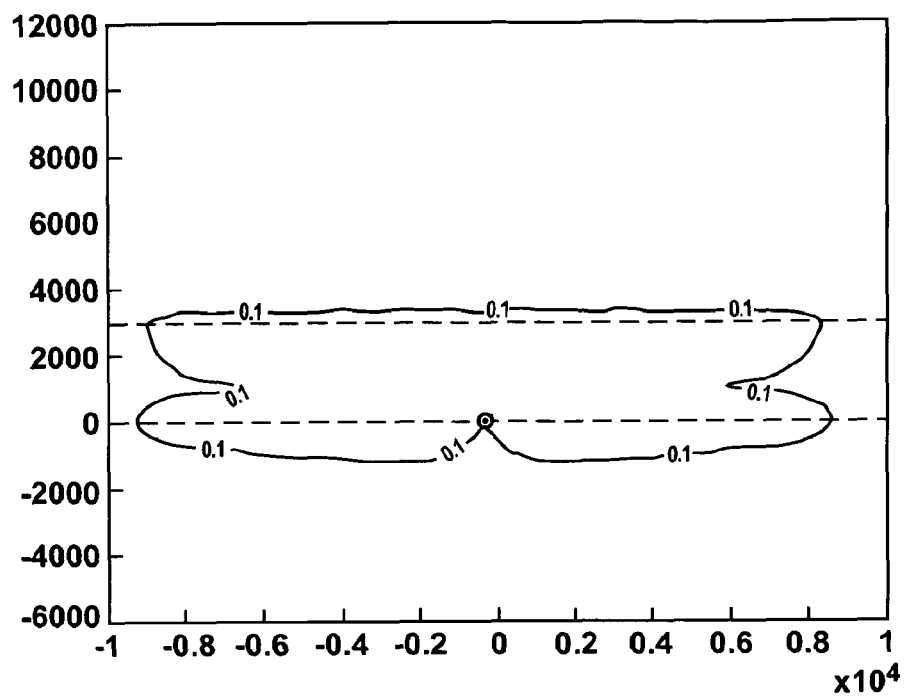
FIG. 24 shows the coverage pattern for a single receiver and two source lines (one over the receiver and one with 3 km broadside offset) for the maximum (peak) more resistive horizontal resistivity vs. unchanged horizontal resistivity NSDR being displayed using inline and broadside patterns.

FIG. 24 shows the lesser sensitivity to horizontal resistivity when the broadside offset is 3 km. Here the sensitivity is less than half what it is with a 6 km broadside offset. This is surprising since the target is centered at about 1.5 km below the water bottom. The peak horizontal sensitivity thus occurs with an offset of four times the target depth which is quite large. It seems unlikely that this would have been predicted by traditional survey design approaches without the benefit of an NSDR horizontal resistivity study using the present inventive method.

The sensitivity in FIG. 23 also motivates an optimal receiver configuration. It is readily noted that the area of peak sensitivity is in a roughly circular zone between the two source lines. If a second receiver were placed on the parallel source line at the top of the circular zone (opposite the current receiver), it would provide unnecessary duplication of the same coverage area. As a result, a better placement of receivers along the parallel source line would be to stagger the positions as will be observed in FIGS. 25-29. The circular, high-sensitivity zones would then overlap efficiently as can be observed noting the scalloped pattern of the 0.3 contour on FIG. 26, for example. This observation of the value of staggered receivers would not have been obvious without the benefit of the NSDR analysis.

Figure 25:
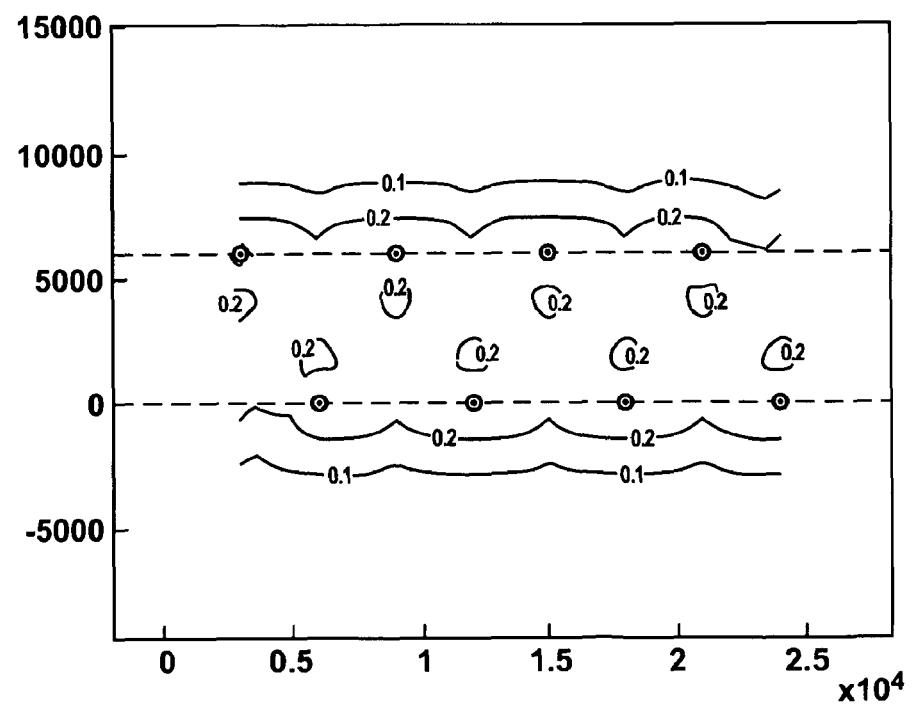
FIG. 25 shows the coverage pattern for staggered receivers (6 km spacing) and two source lines (6 km separation) for the maximum (peak) reservoir vs. no-reservoir anomaly being displayed using inline and broadside patterns.
Figure 26:
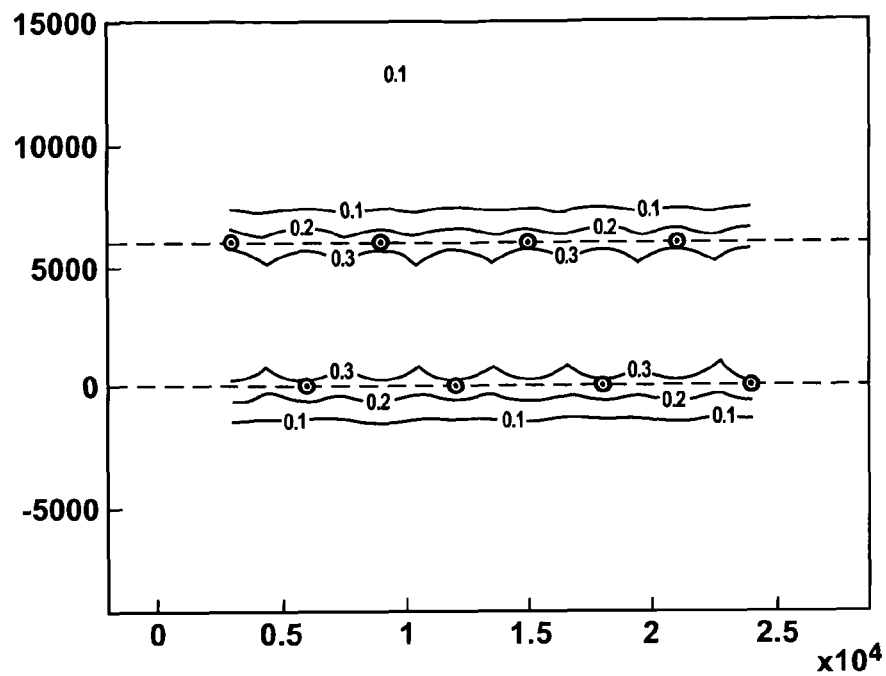
FIG. 26 shows the coverage pattern for staggered receivers (6 km spacing) and two source lines (6 km separation) for the maximum (peak) more resistive horizontal resistivity vs. unchanged horizontal resistivity NSDR being displayed using inline and broadside patterns.

Next, assume that a survey along a transect (2D cross section) is sufficient to meet the survey objectives. Following from the previous discussion, a particular and efficient solution is illustrated in FIGS. 25 and 26. Two parallel source lines are used with 6 km separation and staggered receivers separated by 6 km. The coverage along the transect is shown to be adequate for discrimination of both reservoir vs. no-reservoir (FIG. 25) and for horizontal resistivity change vs. no change (FIG. 26). The two-line solution is considered to be minimally acceptable since it has coverage without gaps. (Larger receiver spacing would introduce gaps in the coverage.) A single-line solution of this type would not be acceptable since it would not have adequate discrimination with respect to horizontal resistivity changes.

Figure 27:
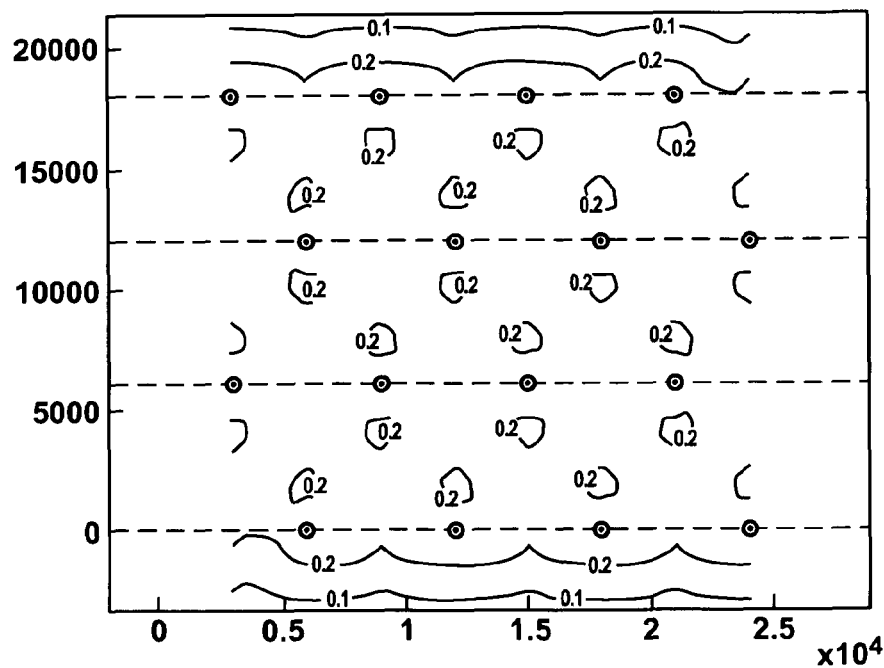
FIG. 27 shows the coverage pattern for staggered receivers (6 km spacing) and multiple source lines (6 km separation) for the maximum (peak) reservoir vs. no-reservoir anomaly being displayed using inline and broadside patterns.
Figure 28:
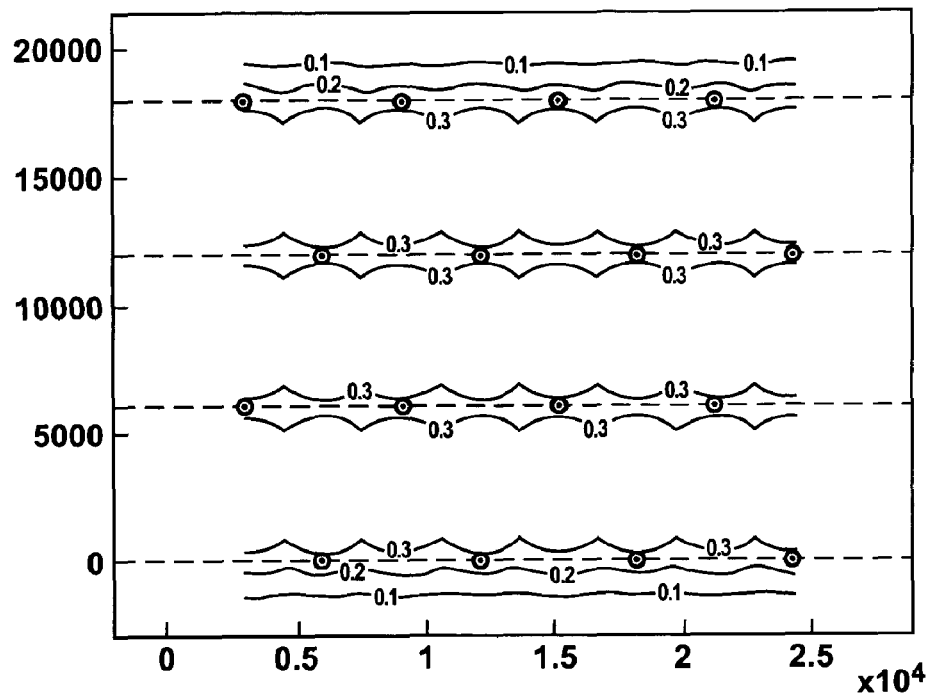
FIG. 28 shows the coverage pattern for staggered receivers (6 km spacing) and multiple source lines (6 km separation) for the maximum (peak) more resistive horizontal resistivity vs. unchanged horizontal resistivity NSDR being displayed using inline and broadside patterns.

In a second implementation, it is assumed that the survey objective is to cover a larger area. A particular and efficient solution for this case is illustrated in FIGS. 27 and 28. For this solution, a set of parallel source lines are used with 6 km separation and with staggered receivers separated by 6 km. The coverage over the area is shown to be adequate for discrimination of both reservoir vs. no-reservoir (FIG. 27) and for horizontal resistivity change vs. no change (FIG. 28).

Figure 29:
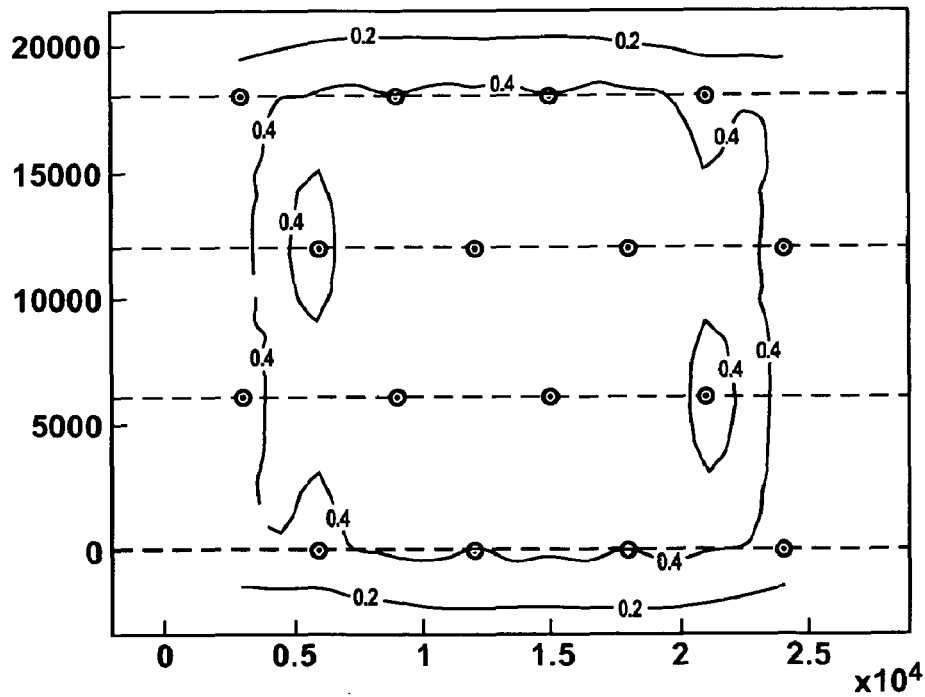
FIG. 29 shows the coverage pattern for staggered receivers (6 km spacing) and multiple source lines (6 km separation) for the root square-sum reservoir vs. no-reservoir anomaly being displayed using inline and broadside patterns.

The particular solutions shown in this example have adequate coverage with respect to vertical and horizontal resistivity changes (i.e., resistivity anisotropy). A separate question is whether these designs will provide adequate redundancy or fold to see the anomalies of interest. FIG. 29 shows an RSS or equivalent anomaly display corresponding to FIG. 27. In this display, the equivalent anomaly is generally larger than 40%. If a larger equivalent anomaly is needed, then a denser survey would be required possibly including more receivers or source lines (e.g., crossing source lines or reduced line or receiver spacing). The reduced redundancy in a reconnaissance survey is used in cases where the anomaly is expected to be large or, in other words, where one is willing to accept that smaller anomalies may be missed.

The particular solutions shown in this example have adequate coverage with respect to vertical and horizontal resistivity changes (i.e., resistivity anisotropy). A separate question is whether these designs will provide adequate redundancy or fold to see the anomalies of interest. FIG. 29 shows an RSS or equivalent anomaly display corresponding to FIG. 27. In this display, the equivalent anomaly is generally larger than 40%. If a larger equivalent anomaly is needed, then a denser survey would be required possibly including more receivers or source lines (e.g., crossing source lines or reduced line or receiver spacing). The reduced redundancy in a reconnaissance survey is used in cases where the anomaly is expected to be large or, in other words, where one is willing to accept that smaller anomalies may be missed.

Other reconnaissance designs based on the NSDR analysis include: a single source line with extra offline receivers or a single source line with merged simulated magnetotelluric (MT) data. (MT data may be simulated by, for example, placing a source at the air surface boundary of the model propagating vertically downward, and repeating as necessary for different frequencies.) In the former case, the inline and offline receivers will all have sensitivity to the reservoir vs. no-reservoir NSDR while the offline receivers will provide most of the coverage with respect to the change in horizontal resistivity NSDR. In the latter case, the inline CSEM data will provide the sensitivity to reservoir vs. no-reservoir while the MT data will provide sensitivity to changes in horizontal resistivity. This MT sensitivity is due to the fact that the MT data are oriented such that the fields are largely horizontal. Other combinations of data could also be studied using the NSDR approach to see if adequate coverage exists with respect to vertical and horizontal resistivity.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for designing a controlled-source electromagnetic survey of a subsurface region for resistive bodies, including receiver deployment, source line location, and source transmission parameters, said method comprising:
   a) developing a geological model of the subsurface region, said model comprising a deep, marginal target reservoir characterized by resistivity higher than background;
   b) selecting a source transmission frequency tailored to the depth of the deep marginal target reservoir;
   c) determining an initial survey design, specifying one or more source lines and one or more receiver locations, using the geologic model and the transmission frequency, and using as a criterion that the design must be able to discriminate between a model that includes the deep marginal target reservoir and a second model that is identical except that the target reservoir is replaced by background;
   d) specifying one or more additional A vs. B scenarios that the survey design must be able to discriminate upon inversion of the survey's electromagnetic field measurements in order to obtain a unique resistivity structure for the subsurface region;
   e) selecting an A vs. B scenario, and adapting the subsurface model as necessary to describe A and again to describe B;
   f) selecting an initial survey design including at least one selected transmission frequency;
   g) forward modeling data for the selected survey design from the previous step using the adapted models;
   h) obtaining a quantitative comparison of the forward-modeled data, A vs. B, at a plurality of (x,y) locations in the survey, resulting in a survey area coverage display for the selected survey design and scenario, wherein said quantitative comparison may be called a Null-Space Discriminating Ratio ("NSDR");
   i) repeating steps (e)-(h) for any other scenarios specified in step (d);
   j) constructing at least one survey area coverage display based on NSDR values at the plurality of (x,y) locations in the survey; and
   k) choosing a final survey design based at least partly on the coverage displays and corresponding survey designs; wherein the number of variables affecting survey area coverage displays is reduced to a pre-selected number.

2. The method of claim 1, wherein the initial survey design for the reservoir vs. no reservoir scenario of step (c) consists of a single source line with at least one in-line receiver and the frequency selected in step (b).

3. The method of claim 2, further comprising, for at least one A vs. B scenario, generating an area coverage display for a second survey design wherein one or more broadside receivers are added to the single source line with at least one in-line receiver of the initial survey design resulting from step (c).

4. The method of claim 3, wherein the A vs. B scenario for which the second survey design is used is a reservoir (A) vs. resistive background (B) scenario.

5. The method of claim 1, wherein the A model developed in step (e) includes the deep marginal target reservoir and the B model includes a selected false positive feature in lieu of said deep marginal target reservoir, and further comprising after step (h) tuning the false positive feature's resistivity to generate NSDR values substantially matching those generated by the A model, then modifying the initial survey design from step (f) and repeating steps (g)-(h) until corresponding NSDR values in the coverage patterns for the A and B models differ according to a pre-selected criterion or another stopping point is reached.

6. The method of claim 5, wherein the selected false positive feature in the B model is greater resistivity in the vicinity of the target reservoir's location (in the A model) than the subsurface region's average resistivity, and the corresponding survey design modification is adding at least one broadside receiver.

7. The method of claim 5, wherein the models are tuned such that differences between them fall in the model null space.

8. The method of claim 1, further comprising after step (h), comparing NSDR values from a coverage pattern against a pre-selected criterion, and if the criterion is not met, modifying the survey design of step (f) and repeating steps (g)-(h);

and optionally repeating the preceding until a pre-selected criterion is met or other stopping point reached.

9. The method of claim 1, wherein the specified A vs. B scenarios include a reservoir (A) vs. resistive background (B) scenario, wherein the B model is characterized by greater resistivity in the vicinity of the target reservoir's location (in the A model) than the subsurface region's average resistivity.

10. The method of claim 9, wherein the initial survey model for the reservoir vs. resistive background scenario is a single source line with at least one in-line receiver and at least one broadside receiver.

11. The method of claim 9, further comprising tuning the resistivity of the resistive background such that the corresponding models cannot be distinguished by their NSDR values.

12. The method of claim 1, wherein the subsurface region lies under a body of water, and the no-reservoir model is a one-dimensional layered model, varying only in the vertical direction and having three layers: air, water and subsurface.

13. The method of claim 1, wherein the specified A vs. B scenarios include a scenario wherein the B model is generated by substituting a shallower, less resistive body in lieu of the deep marginal target reservoir of the A model.

14. The method of claim 13, further comprising after step (h) tuning the shallow body's resistivity to generate NSDR values substantially matching those generated by the A model, then modifying the initial survey design from step (f) and repeating steps (g)-(h) until corresponding NSDR values in the area coverage displays for the A and B models differ according to a pre-selected criterion or another stopping point is reached.

15. The method of claim 14, wherein a resulting survey design modification comprises adding at least one additional transmission frequency.

16. The method of claim 1, wherein the survey design that discriminates between a reservoir model and a no-reservoir model is determined in step (c) by modifying a first-guess survey design as needed based on NSDR values in a survey area coverage display.

17. The method of claim 16, wherein the reduction in the number of variables is such that the NSDR values in the survey area coverage display for the reservoir vs. no-reservoir scenario are functions of only reservoir position, source line locations, and receiver positions.

18. The method of claim 1, wherein the reduction in the number of variables includes defining the NSDR values as peak normalized differences between corresponding electromagnetic field values generated by model A and model B, where peak means the maximum value at any usable offset or frequency.

19. The method of claim 18, wherein the electromagnetic field values are each a single number given by the complex difference of the three electric field components ($E_X$, $E_Y$, and $E_Z$).

20. The method of claim 1, wherein the one or more additional A vs. B scenarios specified in step (d) include a scenario wherein A and B represent anisotropic resistivity models that are identical except for a difference in horizontal resistivity.

21. A method for producing hydrocarbons from a subsurface region, comprising:
   a) obtaining a design for a controlled-source electromagnetic survey of the subsurface region, said design having been made by a method as described in claim 1, which description is incorporated herein by reference;
   b) performing the survey based on the design;
   c) identifying a reservoir at least partly from the results of said survey;
   d) drilling a well into the reservoir; and
   e) producing hydrocarbons from said reservoir.

22. A method for designing a controlled-source electromagnetic survey (CSEM) of a subsurface region for resistive bodies, said method comprising using a numerical discriminating factor to determine whether a proposed survey design can discriminate between two different hypothetical scenarios for the resistivity structure of the subsurface region, wherein the discriminating factor is related to a difference between two simulations of CSEM data using the proposed survey design, one simulation using a resistivity model of one of the two scenarios and the other simulation using a resistivity model of the other scenario, and wherein values of the discriminating factor representing the two models are computed for a plurality of (x,y) positions of a resistivity feature that differs between the two resistivity models, and are displayed in a 2D area display in which one or more survey receivers and at least one source line occupy fixed positions according to the proposed survey design.

23. The method of claim 22, further comprising evaluating the proposed survey design based on area coverage indicated by the values of the discriminating factor in the 2D area display.

24. The method of claim 23, further comprising varying the proposed survey design by either adding one or more receivers or one or more source lines, or both, and repeating the method of claim 23 with a revised proposed survey design until the evaluation of a final survey design satisfies a pre-selected criterion or other stopping condition is met.

25. The method of claim 22, wherein one of the resistivity models includes a resistive anomaly representing a target hydrocarbon reservoir or other resistivity structure of interest.

26. The method of claim 22, wherein the discriminating factor is a Null Space Discriminating Ratio (NSDR), said NSDR being a normalized difference between the two simulations of CSEM data.

27. The method of claim 22, wherein the two resistivity models represent anisotropic resistivity, and differ only in values of one resistivity component at selected cells in the model, and further comprising evaluating the proposed survey design for sensitivity to resistive anisotropy based on area coverage indicated by the values of the discriminating factor in the 2D area display.

28. The method of claim 23, wherein the proposed survey design has only one source line located directly above a parallel line of receivers, but further comprising combining simulated magnetotelluric data with the simulated CSEM data for purposes of computing values of the discriminating factor.

29. The method of claim 22, wherein the proposed survey design includes only a single source line with both inline and offline receivers, and further comprising varying the proposed survey design and repeating the method of claim 23 with a revised proposed survey design until the evaluation of a final survey design satisfies a pre-selected criterion or other stopping condition is met, provided that all revised survey designs will adhere to the limitations of a single source line with both inline and offline receivers, with allowed variations being with respect to receiver spacing or location relative to the source line, or number of receivers.

30. The method of claim 22, wherein the proposed survey design includes exactly two parallel source lines with staggered receiver positions, and further comprising varying the proposed survey design and repeating the method of claim 23 with a revised proposed survey design until the evaluation of a final survey design satisfies a pre-selected criterion or other stopping condition is met, provided that all revised survey designs will adhere to the limitations of exactly two parallel source lines with staggered receiver positions, with allowed variations being with respect to receiver spacing or lateral distance from a source line, or number of receivers.

31. The method of claim 22, wherein the resistivity feature that differs between the two resistivity models is a resistive body having resistivity greater than background, and its (x,y) positions refer to lateral positions of the body's center in multiple computer simulations required to generate the 2D area display of discriminating factor data.

* * * * *